(12) United States Patent
Marohn et al.

(10) Patent No.: US 10,394,784 B2
(45) Date of Patent: Aug. 27, 2019

(54) TECHNOLOGIES FOR MANAGEMENT OF LOOKUP TABLES

(71) Applicant: INTEL CORPORATION, Santa Clara, CA (US)

(72) Inventors: Byron Marohn, Albuquerque, NM (US); Christian Maciocco, Portland, OR (US); Sameh Gobriel, Hillsboro, OR (US); Ren Wang, Portland, OR (US); Wei Shen, San Carlos, CA (US); Tsung-Yuan Charlie Tai, Portland, OR (US); Saikrishna Edupuganti, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 378 days.

(21) Appl. No.: 15/389,218

(22) Filed: Dec. 22, 2016

(65) Prior Publication Data

US 2018/0181604 A1 Jun. 28, 2018

(51) Int. Cl.
*G06F 16/22* (2019.01)
*G06F 3/06* (2006.01)
*G06F 16/00* (2019.01)
*H04L 12/701* (2013.01)

(52) U.S. Cl.
CPC ............ *G06F 16/2264* (2019.01); *G06F 3/06* (2013.01); *G06F 16/00* (2019.01); *H04L 45/00* (2013.01)

(58) Field of Classification Search
CPC .... G06F 16/2264; G06F 16/285; G06F 16/22; G06F 16/35; G06F 16/355; G06F 3/0482
USPC .................................................. 707/743, 737
See application file for complete search history.

(56) References Cited

U.S. PATENT DOCUMENTS

| | | |
|---|---|---|
| 5,970,232 A | 10/1999 | Passint et al. |
| 6,674,720 B1 | 1/2004 | Passint et al. |
| 8,854,972 B1 | 10/2014 | Li |
| 2004/0054924 A1 | 3/2004 | Chuah et al. |
| 2004/0085953 A1 | 5/2004 | Davis |

(Continued)

FOREIGN PATENT DOCUMENTS

WO WO2015-066719 A2 5/2015

OTHER PUBLICATIONS wikipedia.org, "Lookup table," Wikipedia, The Free Encyclopedia, retrieved from: https://en.wikipedia.org/w/index.php?title=Lookup_table&oldid=604105487 on Apr. 17, 2017, 7 pages.

(Continued)

*Primary Examiner* — Dung K Chau
(74) *Attorney, Agent, or Firm* — Schwabe, Williamson & Wyatt, P.C.

(57) ABSTRACT

Technologies for managing lookup tables are described. The lookup tables may be used for a two-level lookup scheme for packet processing. When the tables need to be updated with a new key for packet processing, information about the new key may be added to a first-level lookup table and a second-level lookup table. The first-level lookup table may be used to identify a handling node for an obtained packet, and the handling node may perform a second-level table lookup to obtain information for further packet processing. The first lookup table may be replicated on all the nodes in a cluster, and the second-level lookup table may be unique to each node in the cluster. Other embodiments are described herein and claimed.

28 Claims, 6 Drawing Sheets

(56) References Cited

U.S. PATENT DOCUMENTS

| | | | |
|---|---|---|---|
| 2004/0100950 | A1 | 5/2004 | Basu et al. |
| 2004/0143710 | A1* | 7/2004 | Walmsley ............ B41J 2/04505 |
| | | | 711/144 |
| 2005/0097196 | A1 | 5/2005 | Wronski et al. |
| 2005/0174272 | A1* | 8/2005 | Cadambi ................. H04L 45/00 |
| | | | 341/106 |
| 2008/0080473 | A1 | 4/2008 | Thubert et al. |
| 2009/0157684 | A1 | 6/2009 | Andersen et al. |
| 2010/0058027 | A1 | 3/2010 | Gong et al. |
| 2011/0016223 | A1 | 1/2011 | Iannaccone et al. |
| 2011/0191389 | A1 | 8/2011 | Okamoto |
| 2012/0143877 | A1 | 6/2012 | Kumar et al. |
| 2013/0242996 | A1 | 9/2013 | Varvello et al. |
| 2014/0064092 | A1 | 3/2014 | Basso et al. |
| 2014/0195545 | A1 | 7/2014 | Anand et al. |
| 2015/0163206 | A1* | 6/2015 | McCarthy ........... G06F 21/6227 |
| | | | 713/171 |
| 2015/0288605 | A1 | 10/2015 | Yan et al. |
| 2015/0288655 | A1 | 10/2015 | Narasimhamurthy et al. |
| 2015/0312144 | A1 | 10/2015 | Gobriel et al. |
| 2015/0312155 | A1 | 10/2015 | Anand et al. |
| 2016/0124864 | A1 | 5/2016 | Sun et al. |
| 2016/0210340 | A1 | 7/2016 | Cai et al. |
| 2016/0241474 | A1 | 8/2016 | Wang et al. |
| 2017/0041296 | A1* | 2/2017 | Ford ..................... G06F 16/951 |
| 2017/0046412 | A1* | 2/2017 | Levy ................... G06F 16/2453 |
| 2017/0102678 | A1* | 4/2017 | Nixon ..................... G05B 17/02 |
| 2017/0102693 | A1* | 4/2017 | Kidd ................ G05B 19/41865 |
| 2017/0102694 | A1* | 4/2017 | Enver .............. G05B 19/41875 |
| 2017/0102696 | A1* | 4/2017 | Bell .................... G05B 23/0275 |
| 2017/0103103 | A1* | 4/2017 | Nixon ................... G06F 16/256 |
| 2017/0286003 | A1 | 10/2017 | Sala et al. |
| 2017/0373960 | A1 | 12/2017 | Sachdev et al. |

OTHER PUBLICATIONS wikipedia.org, "Bloom filter," Wikipedia, The Free Encyclopedia, retrieved from: https://en.wikipedia.org/w/index.php?title=Bloom_filter&oldid=602326401 on Apr. 17, 2017, 15 pages.

Hichem et al., "IP address lookup for Internet routers using cache routing table," IJCI International Journal of Computer Science Issues, vol. 7, Issue 4, No. 8, Jul. 2010, pp. 35-40.

Chen et al., "A Reliable Broadcast/Multicast Scheme for Multiple Mobile Ad Hoc Networks," IEICE Transactions on Communications, vol. E89-B, No. 3, Mar. 2006, pp. 867-878.

Office Action dated May 27, 2016 for U.S. Appl. No. 14/264,912, 14 pages.

Final Office Action dated Nov. 2, 2016 for U.S. Appl. No. 14/264,912, 12 pages.

Office Action dated Dec. 30, 2016 for U. S. Appl. No. 14/750,918, 20 pages.

Zhong et al., "Scaling Up Clustered Network Appliances with ScaleBricks," SIGCOMM'15, Aug. 17, 2015, London, United Kingdom, pp. 241-254.

Office Action dated Jun. 12, 2017 for U.S. Appl. No. 14/264,912, 5 pages.

Office Action dated Sep. 7, 2018 for U.S. Appl. No. 15/473,413, 37 pages.

International Search Report and Written Opinion dated Feb. 9, 2018 for International Application No. PCT/US2017/061145, 11 pages.

International Search Report and Written Opinion dated Jan. 4, 2018 for International Application No. PCT/US2017/050324, 9 pages.

International Preliminary Report on Patentability dated May 2, 2019 for International Application No. PCT/US2017/050324, 6 pages.

* cited by examiner

TECHNOLOGIES FOR MANAGEMENT OF LOOKUP TABLES

FIELD

The present disclosure relates to the field of data processing, and in particular, to apparatuses, methods and storage media for managing tables used for packet processing in computer clusters.

BACKGROUND

Modern computer devices are capable of communicating (i.e., transmitting and receiving data) with other computer devices over various data networks, such as cellular networks, WiFi, Ethernet, Internet, and so forth. To facilitate the communications between computer devices, the networks typically include one or more network devices (e.g., a network switch, a network router, etc.) to route the communications (i.e., network packets) from one computer device to another based on network flows. In some cases, the routing of communications may be performed by a cluster of computer devices that act in concert to perform the functions of a network device.

For example, a cluster of interconnected server nodes can be used for network packet routing and switching. In a server node cluster, each server node may receive network packets from one or more external ports and dispatch the received network packets to the other server nodes for forwarding to a destination or egress ports based on identification key-value pairs of the network flow. To route the network traffic through the server node cluster, the server nodes generally use a routing table (i.e., routing information base (RIB)) and a forwarding table (i.e., forwarding information base (FIB)).

As each server node is added to the cluster, not only does the forwarding capacity of the cluster increase, but so does the number of destination addresses it can reach. As the size of the infrastructure of the network is scaled up, the size of each of the routing table and the forwarding table also increases, and can become very large. Larger routing tables require more time and computing resources (e.g., memory, storage, processing cycles, etc.) to perform lookups on the routing/forwarding table (hereinafter, the terms routing table, forwarding table or other similar terms may be considered synonymous, unless the context clearly indicates otherwise; also they may be generically referred as lookup table). Additionally, adverse effects of such scaling may include additional hops (i.e., each passing of the network packet between server nodes) required to process the network packet, or lookups being performed across the cluster's internal switch fabric, for example. Such adverse effects may result in decreased throughput and/or a forwarding table size that exceeds a forwarding table capacity. Moreover, as server nodes are added to the cluster, computing resources need to update the forwarding tables may also increase.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
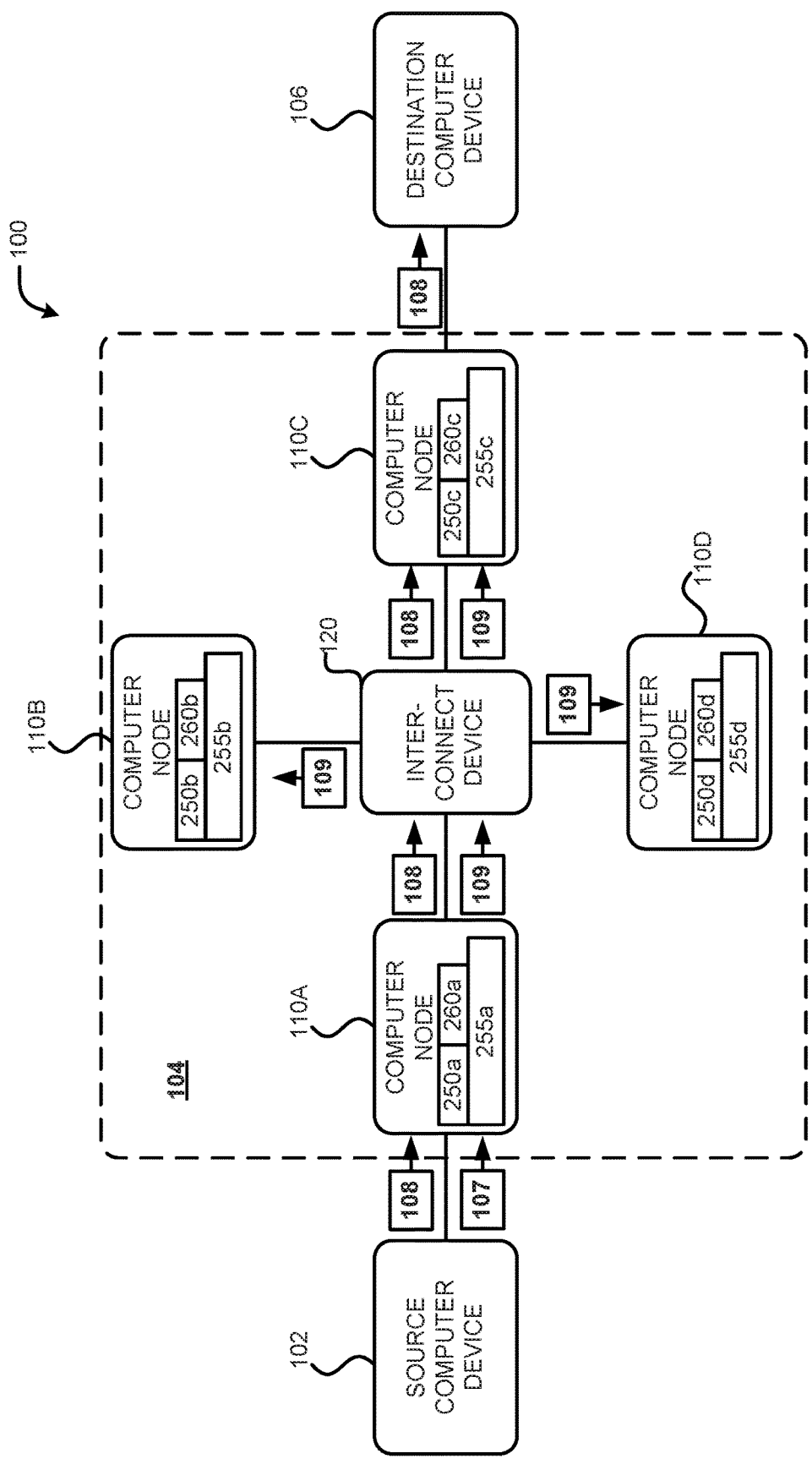
FIG. 1 shows an arrangement suitable for practicing various embodiments of the present disclosure.

Embodiments are directed towards managing lookup tables in a cluster acting as a router and/or a switch. In some implementations where a cluster of interconnected server nodes perform network packet routing and switching, a distributed a two-level lookup architecture (also referred to as a "two-level hashing architecture", "two-level lookup scheme", and the like) may be used to achieve relatively high performance packet switching/routing. In the two-level lookup architecture, each node may store a first lookup table called a global lookup table (GT) and a local lookup table (LT). The GT may map keys (e.g., flow identifiers (IDs)) to values (e.g., node IDs) of key-value pairs, and may be replicated across each node in the cluster. In various implementations, the GT may store the values (e.g., node IDs) without storing the corresponding keys (e.g., flow IDs). The LT may store information for performing various packet processing procedures, such as obtaining an output port for the switch/router, to recover packet metadata for further processing, and/or other like packet processing operations. In addition, each node in the cluster may perform a first-level lookup operation on their GT and/or a second-level lookup operation on their LT. For instance, when a first (receiving or ingress) node receives a packet, the first node may perform a first-level lookup on a locally stored GT to obtain a node ID for a second (destination or handling) node. The first node may forward the packet to the second node using the node ID. When the second node receives the packet from the first node, the second node may perform a second-level lookup on a locally stored LT to obtain information for performing additional packet processing procedures. This two-level architecture may be applied to not only nodes in a server cluster, but also to core in a multi-core machine, virtual machines (VM) on a system containers in a virtualized system, and/or other implementations.

Problems may arise when the GTs and/or LTs have to be updated with new or alternative keys or destination information. For example, some packets may be routed to an old handling node while the update is taking place and is implemented by all of the nodes in the cluster. One solution to such problems may include using a lock mechanism, wherein packets that should be routed to a new destination are queued or discarded until the update is implemented. However, using such lock mechanisms may cause packet bottlenecks, slowdowns, and/or overload scenarios.

In embodiments, nodes in a cluster may implement a variant of a two-level lookup scheme. In the variant two-level lookup scheme, each node in the cluster may be capable of manipulating a distinct portion of the GT independently of other nodes. In this way, the computing resources needed to update the GT may be distributed across the cluster. To perform updates, each node may locally store an online version of the GT and an offline version of the GT. The online GT may be used to perform the two-level lookup scheme as discussed previously, and the offline GT may be used for updating the GT. For instance, when the GT has to be updated with a new value of a key-value pair, each node may determine whether the update is to occur to their portion of the GT. When a node determines that the update is to apply to its portion of the GT, that node may update its offline GT. Once updated, that node may distribute the update to the other nodes in the cluster so that they may implement the updates to their locally stored version of the GT and/or LT. Other embodiments are described and/or claimed.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

The description may use the phrases "in an embodiment", "in an implementation", or in "embodiments" or "implementations", which may each refer to one or more of the same or different embodiments. References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Moreover, the terms "comprising," "including," "having," and the like, as used with respect to embodiments of the present disclosure, are synonymous.

Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As disclosed herein, the term "memory" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

As used herein, the term "circuitry" refers to, is part of, or includes hardware components such as an Application Specific Integrated Circuits (ASICs), field-programmable gate array (FPGAs), programmable logic arrays (PLAs), complex programmable logic devices (CPLDs), one or more electronic circuits, one or more logic circuits, one or more processors (shared, dedicated, or group) and/or memory (shared, dedicated, or group) that are configured to provide the described functionality. In some embodiments, the circuitry may execute computer-executable instructions to provide at least some of the described functionality. The computer-executable instructions may represent program code or code segments, software or software logics, firmware, middleware or microcode, procedures, functions, subprograms, routines, subroutines, one or more software packages, classes, or any combination of instructions, data structures, program statements, and/or functional processes that perform particular tasks or implement particular data types. The computer-executable instructions discussed herein may be implemented using existing hardware in computer devices and communications networks.

As used herein, the term "network element," may be considered synonymous to or referred to as a networked computer, networking hardware, network equipment, router, switch, hub, bridge, gateway, base station, access point, or other like device. The term "network element" may describe a physical computer device of a network with wired or wireless communication links. The term "network element" may describe equipment that provides radio baseband functions for data or voice connectivity between a network and one or more users. The term "channel" as used herein may refer to any transmission medium, either tangible or intangible, which is used to communicate data or a data stream. The term "radio link" may be synonymous with and/or equivalent to "link," "channel," "communications tunnel," and/or any other like term denoting a pathway or medium through which data is communicated.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. In addition, various additional operations might be performed, or described operations might be omitted in additional or alternative embodiments. Furthermore, the inclusion of a structural or method feature in a particular figure is not meant to imply that such feature is required in all embodiments and, in some embodiments, may not be included or may be combined with other features. Also, it is noted that example embodiments may be described as a process depicted with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function a main function Referring now to the figures. FIG. 1 shows an arrangement 100 in accordance with various embodiments, suitable for practicing the present disclosure. FIG. 1 includes a cluster 104 communicatively coupled with a source computer device 102 and a destination computer device 106. The cluster 104 may include an interconnect device 120 (e.g., a switch) and a group of individual computer nodes 110A-D (collectively referred to as "computer nodes 110", "computer node 110", "nodes 110", or "node 110"). In some embodiments, the cluster 104 may also include additional nodes 110 as necessary to support network packet throughput.

The nodes 110 may act in concert to perform the functions of a network element. The network element may be a cluster software router; a cluster software switch; a distributed software switch; a distributed software router; a switched fabric for distributed services; a standalone software switch/router or an underline fabric for distributed services in the scope of a network functions virtualization (NFV), and/or a software-defined networking (SDN) architecture, such as in an evolved packet core (EPC) or a virtual EPC (vEPC) model; a core network element in an EPC or System Architecture Evolution (SAE) network, such as a Packet Data Network (PDN) gateway (PGW), Serving Gateway (SGW), Mobility Management Entity (MME), etc.; and/or other like network elements.

In embodiments, each node 110 may be communicatively coupled to the other nodes 110 according to any networking topology. For example, each node 110 may be communicatively coupled to the other nodes 110 according to, among other topologies, a switched network topology, a Clos network topology, a bus network topology, a star network topology, a ring network topology, a mesh networking topology, a butterfly-like topology, and/or any combination thereof.

Each node 110A-D may include a corresponding global lookup table (GT) 250a-d (also referred to as "first-level lookup tables" and the like) and a corresponding local lookup table (LT) 255a-d (also referred to as "second-level lookup tables" and the like). The GTs 250a-d (collectively referred to as "GT 250" and the like) may store values (e.g., node IDs) of a key-value pair, which may be used to direct packets 108 to handling nodes 110. In embodiments, a key (e.g., flow ID included in a packet 108) may be used to obtain an index (e.g., a node index) that indicates where a value (e.g., a node ID) of the key-value pair may be found in the GT 250. The index may be computed using a suitable hash function. In embodiments, the GT 250 may be more compact (e.g., smaller in size) than the LTs 255a-d (collectively referred to as "LT 255" and the like), and may be replicated and/or distributed across all nodes 110 in the cluster 104. In embodiments, the GT 250 may be built using a perfect hashing scheme, which may be a hash function that maps distinct elements in a set to a set of integers without causing index collisions.

The LT 255 may be a routing table (e.g., routing information base (RIB)) including entries from a forwarding table (e.g., forwarding information base (FIB)) that are relevant to the node 110 when acting as a handling node. For example, in FIG. 1, the LT 255c located at node 110C may store information that allows node 110C to process packets 108 when node 110C acts as a handling node. In embodiments, each of the LTs 255 may be unique to the node 110 in which it is stored. In embodiments, the LT 255 may be built using any suitable hashing scheme, such as cuckoo hash function, a jHash function, etc.

In an example, GT 250 may store a mapping of flow IDs to handling node IDs, while the LT 255 may store a mapping of flow IDs to an output ports. In another example, the LT 255 may store a mapping of flow IDs to Tunnel End Point Identifiers (TEIDs) or a mapping of flow IDs to a handling node ID-TEID pair. TEIDs may be used for general packet radio service (GPRS) Tunneling Protocol (GTP) control or user plane tunnels. In other embodiments, the LT 255 may store additional information.

In addition, each node 110 may include an online or active version of the GT 250 (also referred to as the "online GT 250", "online version 250", and the like) and an online/active LT 255 that are used to perform lookup operations. The online GT 250 may be replicated and/or distributed across all of the nodes 110. In embodiments, the entire contents of the GT 250 may be stored at each node 110 in the cluster. A lookup of a key in the online GT 250 may return a node index, which may include a second-level table entry for that key. The LT 255 may be unique to each node and may comprise information for performing additional packet processing operations/procedures.

Furthermore, each node 110 may be responsible for maintaining an offline or inactive version of the GT 250 (also referred to as the "offline GT 250", "offline version 250", and the like). In various embodiments, each node 110 in the cluster 104 may be capable of manipulating (e.g., updating) a distinct portion of the offline GT 250 independently of other nodes 110. In some embodiments, only the portion of the GT 250 that a node 110 is permitted to update/manipulate is stored locally as the offline GT 250 at that node 110. In various embodiments, the GT 250 may be logically divided into N parts, where N is the number of nodes 110 in the cluster 104. In such embodiments, each node 110 may have a copy of the entire contents of the GT 250, however a first node 110 (e.g., node 110A) may be permitted to manipulate the first 1/N slots in the GT 250, a second node 110 (e.g., node 110B) may be permitted to manipulate the second 1/N slots in the GT 250, etc. In embodiments, the copy of the entire GT 250 may be an online version of the GT 250, and each node 110 may store a corresponding 1/N portion of the GT 250 as the offline version of the GT 250. In this way, the computing resources (e.g., computational load, etc.) needed to update the GT 250 may be distributed across the cluster 104. Furthermore, each node 110 may maintain a corresponding version counter 260a-d (collectively referred to as "version counter 260" and the like), which may indicate a version number of the online (or offline) GT 250 and/or a version number for each entry in the online GT 250. In embodiments where a version counter 260 is used to track a version of each entry in the online or offline GTs 250, each node 110 may include a plurality of versions counters 260, where each version counter 260 of the plurality of version counters 260 corresponds to an entry in the online and/or offline GT 250.

Each of the plurality of nodes 110 in the cluster 104 may be capable of acting as both an ingress node and an egress node, and may be configured to perform routing operations (e.g., ingress, lookup, forwarding, and egress operations) for the cluster 104. An ingress node may be a node 110 that receives a packet 108 from the source computer device 102 outside of the cluster 104. The egress node may be a node 110 that provides the packet 108 to the destination computer device 106, which is outside of the cluster 104. The egress node may also be referred to as a "destination node", a "handling node", and the like. In arrangement 100, node 110A may be the ingress node 110A and node 110C may be the egress node 110C. However, any of the nodes 110 may receive the packet 108 from the source computer device 102, and as such, the particular node 110 receiving the packet 108 from outside of the cluster 104 may be designated as the ingress node and is referred to as such in the following description. Similarly, any of the nodes 110 may provide the packet 108 to the destination computer device 106, and as such, the particular node 110 sending the packet 108 outside of the cluster 104 may be designated as the egress node and is referred to as such in the following description.

Furthermore, one or more of the nodes 110 may be intermediate nodes 110 that receive packets 108 from an ingress node 110 and forward those packets 108 to the handling/egress nodes 110 or other intermediate nodes 110. It should be appreciated that a path of packets 108 traveling from the source computer device 102 through one or more nodes 110 of the cluster 104 to the destination computer device 106 may be referred to as a "data path" or "flow." Moreover, while FIG. 1 shows that the source computer device 102 and the destination computer device 106 are communicatively coupled with nodes 110A and 110C, it should be appreciated that each of the nodes 110A-D may be communicatively coupled to any number of different networks and/or subnetworks, network devices, and/or other software cluster switches. As such, any of the nodes 110 may receive network packets originating from one network and may forward the network packets to a different network.

According to various embodiments, the nodes 110 in the cluster 104 may perform a two-level lookup scheme as follows. Upon receipt of a packet 108, the ingress node 110A may extract or otherwise identify a flow ID (e.g., a media access code (MAC) address of a target computer device, an internet protocol (IP) address of a target computer device, a 5-tuple flow identifier, etc.) in the packet 108, and perform a lookup operation on the (locally stored) online GT 250 to identify an egress node 110C (e.g., a handling node) responsible for processing the packet 108 within the cluster 104. The lookup operation performed on the online GT 250 may be referred to as a "first-level lookup." The ingress node 110A may obtain a node ID of the egress node 110C based on a result of the first-level lookup. The ingress node 110A may then forward the packet 108, using the obtained node ID, to the handling node 110C directly or indirectly via the interconnect device 120. After the handling node 110C obtains the packet 108, the handling node 110C may perform a lookup operation on the (locally stored) online LT 255 to obtain information for further processing the packet 108. The lookup operation performed on the LT 255 may be referred to as a "second-level lookup." After the handling node 110C processes the packet 108, the handling node 110C may provide the packet 108 to the destination computer device 106. A detailed description of packet forwarding implementations/procedures is discussed in commonly assigned U.S. application Ser. No. 14/264,912, titled "TECHNOLOGIES FOR DISTRIBUTED ROUTING TABLE LOOKUP", and filed on Apr. 29, 2014; and commonly assigned U.S. application Ser. No. 14/750,918, titled "TECHNOLOGIES FOR MODULAR FORWARDING TABLE SCALABILITY", and filed on Jun. 25, 2015. Each of the aforementioned documents is hereby incorporated by reference in their entirety and for all purposes.

In addition to acting as both an ingress node and an egress node, in various embodiments, each of the plurality of nodes 110 in the cluster 104 may be capable of acting as a control node. The control node may be responsible for managing the plurality of nodes 110 in the cluster 104, which may include obtaining and/or adjusting node system information, setting node attributes, naming or rename a node 110, adding/removing a node 110 from the cluster 104, initializing/terminating a node 110, and updating table information in each of the nodes 110. In embodiments, a node 110 may obtain instructions for managing the plurality of nodes 110 in a control packet 107, which may be obtained from a remote management device or management console operated by a system administrator, network operator, etc. In such embodiments, the source computer device 102 may act as the remote management device or management console. In response to receipt of the packet 107, the node 110 may generate a packet 109 (also referred to as an "update packet 109", etc.) to be distributed to each other node 110 in the cluster 104. In various embodiments, the remote management device or management console may be the control node, while in other embodiments the instructions included in the packet 107 may designate one of the nodes 110 in the cluster to be the control node.

According to various embodiments, when the GT 250 has to be updated with a new value of a key-value pair, the control node 110 may broadcast a packet 109 to each node 110 to indicate that an update is to occur, which may include the new key and/or value to be added or inserted into the GT 250. In some embodiments, the packet 109 may be provided to each node 110 using corresponding node IDs. In response to receipt of the packet 109, each node 110 may determine whether the update should be applied to their portion of the GT 250.

In various embodiments, when a node 110 determines that the update is to apply to its portion of the GT 250, that node 110 may update its offline version of the GT 250. The node that is to apply the update to its portion of the GT 250 may be referred to as a "responsible node." The responsible node 110 may also increment an offline version counter 260 associated with the slot or table entry in which the new value is to be added. The responsible node 110 may package the updated slot or table entry into a message (e.g., another packet 109) and may send the message to a new handling node 110. The new handling node 110 (also referred to as a "new node 110") may be a node 110 that is designated to handle a second-level lookup for the new key. In should be appreciated that despite having new information about where the new key is being handled, in embodiments, the responsible node 110 does not update its own online table with this new information until the update is distributed to the other nodes 110 in the cluster 104.

In various embodiments, upon receiving the message, the new node 110 may add the new key to a locally stored second-level table with the requested value. The new node 110 may then apply the update (e.g., the new value) to its locally stored online GT 250 if the version for the update (e.g., indicated in the message from the responsible node 110) is greater than the current version for that slot. Once the online GT 250 is updated, the new node 110 may perform lookups for the new key and return a correct value if it is included in a data path of a packet 108. Once this is done, the new node 110 may bundle the same update and version that was applied to the locally stored online GT 250 into another message (e.g., another packet 109), and may send the other message to all the other nodes 110 in the cluster 104. As the other nodes 110 receive the update message from the new node 110, the other nodes 110 may determine whether the version number included in the message from the new node 110 is newer (e.g., greater in value) than a version of their locally stored online GTs 250. If true, the other nodes 110 may apply the update to their online GTs 250. Once each node 110 includes the update, data packets 108 with the key (e.g., flow ID) may be handled by the new handling node 110. In embodiments where a value for the new key already exists in the GT 250, the old value may be removed from the GT 250 after performance of the procedures/operations discussed previously. Examples of the update procedures are shown and described with regard to FIGS. 3-6.

The source computer device 102 and the destination computer device 106 may be embodied as any type of computation or computer device capable of performing various arithmetic, logical, input/output (I/O) operations, including, without limitation, sending and receiving packets 108. In this regard, the source computer device 102 and the destination computer device 106 may include one or more processors, one or more memory devices, one or more I/O interfaces, one or more network interface cards, various radio communications devices, and/or other like components. In embodiments, the source computer device 102 and the destination computer device 106 may be wireless access points (e.g., a network switch and/or a network router, a base station, and the like) or an originating computer device (e.g., a client computer device) in wired or wireless network communication with the cluster 104. Examples of computer devices 102, 106 may include mobile computer devices (e.g., a smartphone, a wearable computer device), desktop computers, workstations, laptop computers, notebook computers, tablet computers, network appliances, web appliances, distributed computing systems, processor-based systems, multiprocessor systems, servers (e.g., stand-alone, rack-mounted, blade, etc.), network appliances (e.g., physical or virtual), and/or any type of computer and/or storage device.

The nodes 110 may be embodied as, or otherwise include, any type of computer device capable of performing the functions described herein. In some embodiments, each of the nodes 110 (and interconnect device 120) may be implemented in separate physical computer devices, while in other embodiments one or more of the nodes 110 (and/or interconnect device 120) may be implemented as virtual machines in a same physical computer device. Examples of such computer devices may include a server computer device, such as a rack computing architecture component, a tower computing architecture component, and a blade computing architecture component; a desktop computer, a laptop computer device, a smart appliance, a consumer electronic device, a mobile computer device, a mobile phone, a smart phone, a tablet computer device, a personal digital assistant, a wearable computer device, and/or other type of computer device. An example of such a computer device is shown and described with regard to FIG. 2.

Figure 2:
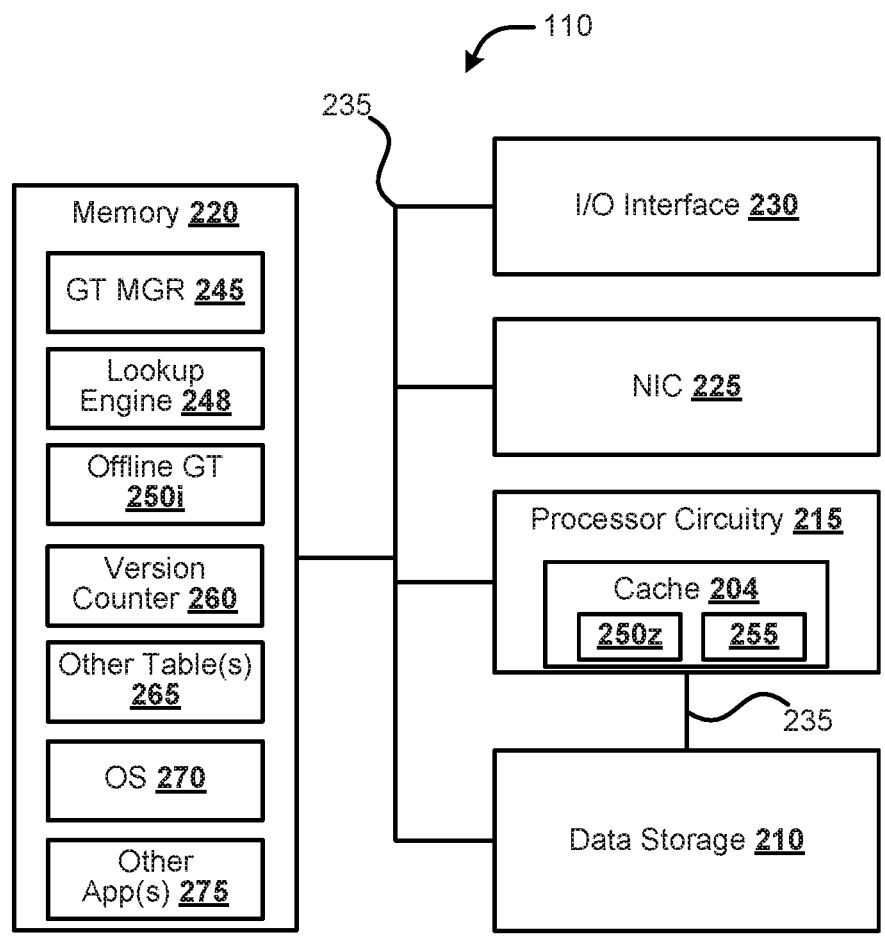
FIG. 2 illustrates the components of a computer node, in accordance with various embodiments.

FIG. 2 illustrates the components of a computer node 110, in accordance with various embodiments. The computing node 110 may include data storage 210, processor circuitry 215, memory 220, network interface circuitry (NIC) 225, and input/output (I/O) interface 230. In other embodiments, the computing node 110 may include additional or alternative components, such as those commonly found in network computer devices. Additionally, in some embodiments, one or more of the illustrative components may be incorporated in, or otherwise form a portion of, another component. For example, the memory 220, or portions thereof, may be incorporated in the processor circuitry 215 in some embodiments. In another example, the memory 220, or portions thereof, may be incorporated in the processor circuitry 215 may be packaged together to form a single package, integrated circuit (IC), or system on chip (SoC).

Processor circuitry 215 may be configured to carry out instructions of a computer program by performing the basic arithmetical, logical, and input/output operations of the node 110. The processor circuitry 215 may include one or more processors (e.g., a single-core processor, a dual-core processor, a triple-core processor, a quad-core processor, etc.), one or more microcontrollers, one or more digital signal processors (DSPs), FPGAs (hardware accelerators), and/or other processor or processing/controlling circuit.

The processor circuitry 215 may perform a variety of other functions for the node 110 by executing program code, logic or software modules, firmware, middleware, microcode, hardware description languages, and/or any other like set of instructions stored in the memory 220. The program code may be provided to processor circuitry 215 by memory 220 via bus 235 and/or via NIC 230 or a separate drive mechanism (not shown). On execution of the program code by the processor circuitry 215, the processor circuitry 215 may cause the node 110 to perform the various operations and functions delineated by the program code, such as the various example embodiments discussed herein. In embodiments where processor circuitry 215 includes (FPGA based) hardware accelerators as well as processor cores, the hardware accelerators (e.g., the FPGA cells) may be pre-configured (e.g., with appropriate bit streams) with the logic to perform some of the functions of OS 270 and/or application(s) 275 (in lieu of employment of programming instructions to be executed by the processor core(s)).

The processor circuitry 215 may include a cache memory 204, which may be embodied as any type of cache memory that the processor circuitry 215 can access more quickly than the memory 220 for storing instructions and/or data for execution, such as an on-die cache or an on-processor cache. In some embodiments, the cache memory 204 may be an off-die cache, but reside on the same SoC as the processor circuitry 215. In embodiments, the cache memory 204 may store an active (online) GT 250z and LT 255. As discussed previously, the online GT 250z may be used to perform a first-level lookup of a two-level lookup scheme, and the LT 255 may be used to perform a second-level lookup of a two-level lookup scheme.

As described previously, the GT 250 is generally more compact than a fully-replicable forwarding table, which may allow the online GT 250z to be replicated and stored within the cache memory 204 at each of the nodes 110 during operation. In embodiments, the online GT 250z may include all of the entries in the GT 250. In embodiments, the GT 250 may be implemented using a set separation mapping strategy, which maps an input key (e.g., flow ID) to a handling node ID of the nodes 110. The set separation mapping strategy may comprise developing a high-level index structure including of smaller groups, or subsets, of the entire set of input keys. Each input key may be derived from a flow ID (e.g., a destination IP address, a destination MAC address, a 5-tuple flow identifier, etc.) that corresponds to a packet 108.

Additionally, the LT 255 may include forwarding table entries that map input keys to handling nodes and, in some embodiments, may include additional information. Each forwarding table 208 of the nodes 110 may store a different set (e.g., a portion, subset, etc.) of forwarding table entries obtained from a routing table 214. As such, the LT 255 at each computing node 110 may be smaller in size (e.g., includes less routing table entries) than typical forwarding tables (e.g., FIBs), which typically include all of the routing table entries of the cluster 104. At the control plane of the cluster 104, the LT 255 may be embodied as a hash table. However, in some embodiments, the LT 255 may be structured or embodied as a collection or group of the individual network routing entries loaded into the cache memory 204 for subsequent retrieval.

Data storage 210 (also referred to as "computer-readable media 210" or "CRM 210") may be any type of device or devices configured for short-term or long-term storage of data such as, for example, memory devices and circuits, memory cards, hard disk drives, solid-state drives, or other data storage devices. For example, the data storage 210 may be configured to store one or more OSs (e.g., OS 270) to be initialized and/or executed by the node 110. In some embodiments, portions of the OSs may be copied to the memory 220 during operations for faster processing and/or any other reason. In addition, the data storage 210 may be configured to store the offline GT 250i, other table(s) 265, and/or other data items.

Memory 220 (also referred to as "computer-readable media 220" or "CRM 220") may be embodied as any type of volatile or non-volatile memory or data storage. The CRM 220 may be configured to store an operating system (OS) 270 and program code for one or more software components, such as GT manager 245, lookup engine 248, and/or one or more other application(s) 275. CRM 220 may be a computer readable storage medium that may generally include a volatile memory (e.g., random access memory (RAM), synchronous dynamic RAM (SDRAM) devices, double-data rate synchronous dynamic RAM (DDR SDRAM) device, flash memory, and the like), non-volatile memory (e.g., read only memory (ROM), solid state storage (SSS), non-volatile RAM (NVRAM), and the like), and/or other like storage media capable of storing and recording data. Instructions, program code and/or software components may be loaded into CRM 220 by one or more network elements via NIC 225 using wired communications interfaces (e.g., from application server 120, a remote provisioning service, etc.). In some embodiments, software components may be loaded into CRM 220 during manufacture of the node 110, or loaded from a separate computer readable storage medium into memory 220 using a drive mechanism (not shown), such as a memory card, memory stick, removable flash drive, removable sim card, a secure digital (SD) card, and/or other like computer readable storage medium (not shown).

During operation, memory 220 may include GT manager 245, inactive (offline) GT 250i, version counter 260, other table(s) 265, operating system (OS) 270, and application(s) 275. OS 270 may manage computer hardware and software resources and provide common services for computer programs. OS 270 may include one or more drivers or application programming interfaces (APIs) that provide an interface to hardware devices thereby enabling OS 270 and other application(s) 275 to access hardware functions without needing to know the details of the hardware itself. The OS 270 may be a general purpose operating system or an operating system specifically written for and tailored to the node 110. GT manager 245 may be a collection of logic and/or program code that enables the node 110 to perform various functions of the node 110, such as generating or updating (e.g., add, delete, or modify) entries of the GT 250i, GT 250z, and LT 255, etc. Lookup engine 248 may be a collection of logic or program code that enables node 110 to performing lookup operations, such as a first-level lookup operation on the GT 250z and a second-level lookup operation on the LT 255. Application(s) 275 may be a collection of logic and/or program code that enables the node 110 to perform various other functions of the node 110.

The offline GT 250i may be a version of the GT 250 that the node 110 uses when making updates to the GT 250. In embodiments, the offline GT 250i may only be a portion of the GT 250 that the node 110 is permitted to modify. For example, when a first node 110 (e.g., node 110A) is permitted to manipulate the first 1/N slots in the GT 250, the offline GT 250i at the first node 110A may only include the first 1/N slots. The version counter 260 may store a version number of the online GT 250z and/or a version number for each entry in the online GT 250. In embodiments, the version counter 260 may be implemented as a software program/module and/or a sequential digital logic circuit and the like. The other table(s) 265 may include a routing table, forwarding table, and/or other like tables of the cluster 104. The routing table may include a plurality of routing table entries, each having information that corresponds to a different network destination (e.g., a network address, a destination network or subnet, a remote computer device etc.). For example, in some embodiments, each routing table entry may include information indicative of a destination IP address (i.e., an IP address of a target computer device and/or a destination subnet), a gateway IP address corresponding to another node 110 through which network packets for the destination IP address should be sent, and/or an egress interface of the computing node 110 through which the network packets for the destination IP address are sent to the gateway IP address. It should be appreciated that the routing table may include any other type of information to facilitate routing a network packet to its final destination. The forwarding table may be a hash table that is similar to the LT 255, but has a size that exceeds the amount of storage available in the cache memory 204. In such embodiments, at least a portion of the forwarding table may instead be stored in the memory 220 and/or data storage 210 of the node 110.

I/O interface 230 may be a computer hardware component that provides communication between the node 110 and one or more other devices (e.g., other nodes 110 in the cluster, interconnect device 120, source computer device 102, destination computer device 106, etc.). The I/O interface 230 may include one or more user interfaces designed to enable interaction with the node 110 and/or peripheral component interfaces designed to provide interaction between the node 110 and one or more peripheral components. User interfaces may include, but are not limited to a physical keyboard or keypad, a touchpad, a speaker, a microphone, a fingerprint or handprint scanning device, etc. Peripheral component interfaces may include, but are not limited to, a non-volatile memory port, communications ports (e.g., universal serial bus (USB) port, FireWire port, Serial Digital Interface (SDI) port), IEEE 1284 port, etc.), an audio jack, a power supply interface. In some embodiments, the I/O interface 230 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the I/O operations. In some embodiments, the I/O interface 230 may form a portion of a system-on-a-chip (SoC) and be incorporated, along with the processor circuitry 215, the memory 220, and other components of the node 110, on a single integrated circuit chip.

Bus 235 may be configured to enable the communication and data transfer between processor circuitry 215, memory 220, NIC 225, I/O interface 230, and data storage 210. Bus 235 may comprise a high-speed serial bus, parallel bus, internal universal serial bus (USB), Front-Side-Bus (FSB), a PCI bus, a PCI-Express (PCI-e) bus, a Small Computer System Interface (SCSI) bus, an SCSI parallel interface (SPI) bus, an Inter-Integrated Circuit (I2C) bus, a universal asynchronous receiver/transmitter (UART) bus, and/or any other suitable communication technology for transferring data between components within node 110.

NIC 225 may be embodied as any type of communication circuit(s), device(s), hardware component(s) or collection thereof, capable of enabling communications between the computing node 110, the source computer device 102, the destination computer device 104, the interconnect device 120, and/or other computing or networking devices via one or more communication networks (e.g., local area networks, personal area networks, wide area networks, cellular networks, a global network such as the Internet, etc.). To this end, NIC 225 may include one or more communication interfaces (e.g., ports) and one or more dedicated processors and/or FPGAs (also referred to as "processor circuitry") to communicate using one or more wired network communications protocols, such as Ethernet, token ring, Fiber Distributed Data Interface (FDDI), Point-to-Point Protocol (PPP), network sockets, and/or other like network communications protocols). The communication interfaces may be configured to communicatively couple the computing node 110 to any number of other nodes 110, the interconnect device 120, networks (e.g., physical or logical networks), and/or external computer devices (e.g., the source computer device 102, the destination computer device 104, other network communication management devices, etc.). In this regard, each communication interface may be associated with a network socket address (e.g., a combination of an IP address and port number) or other like address that allows other devices to connect to the computer node 110. The NIC 225 may also include one or more virtual network interfaces configured to operate with the one or more applications of the computer node 110.

Figure 3:
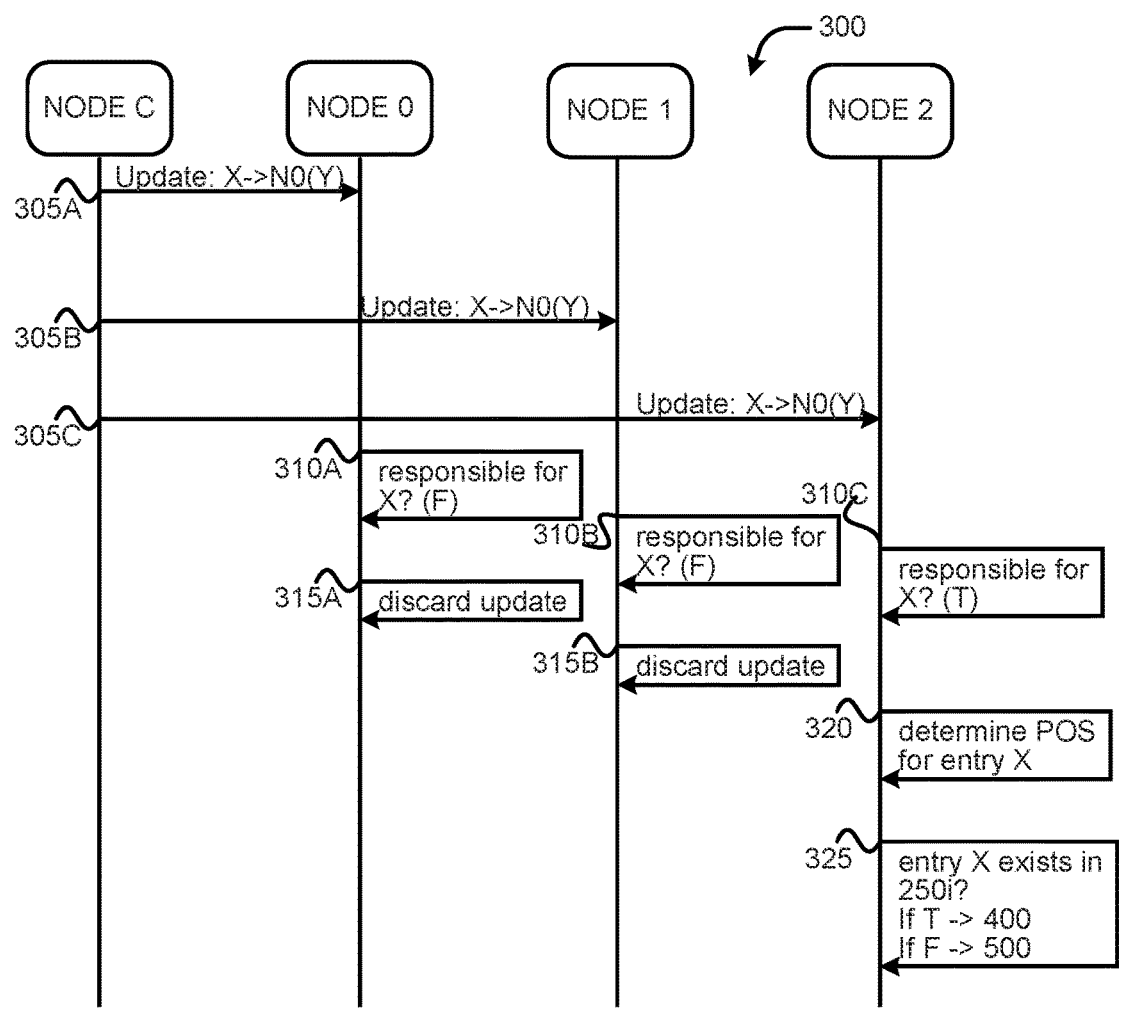
FIGS. 3-5 illustrate processes for updating lookup tables of nodes in a cluster, in accordance with various embodiments.
Figure 4:
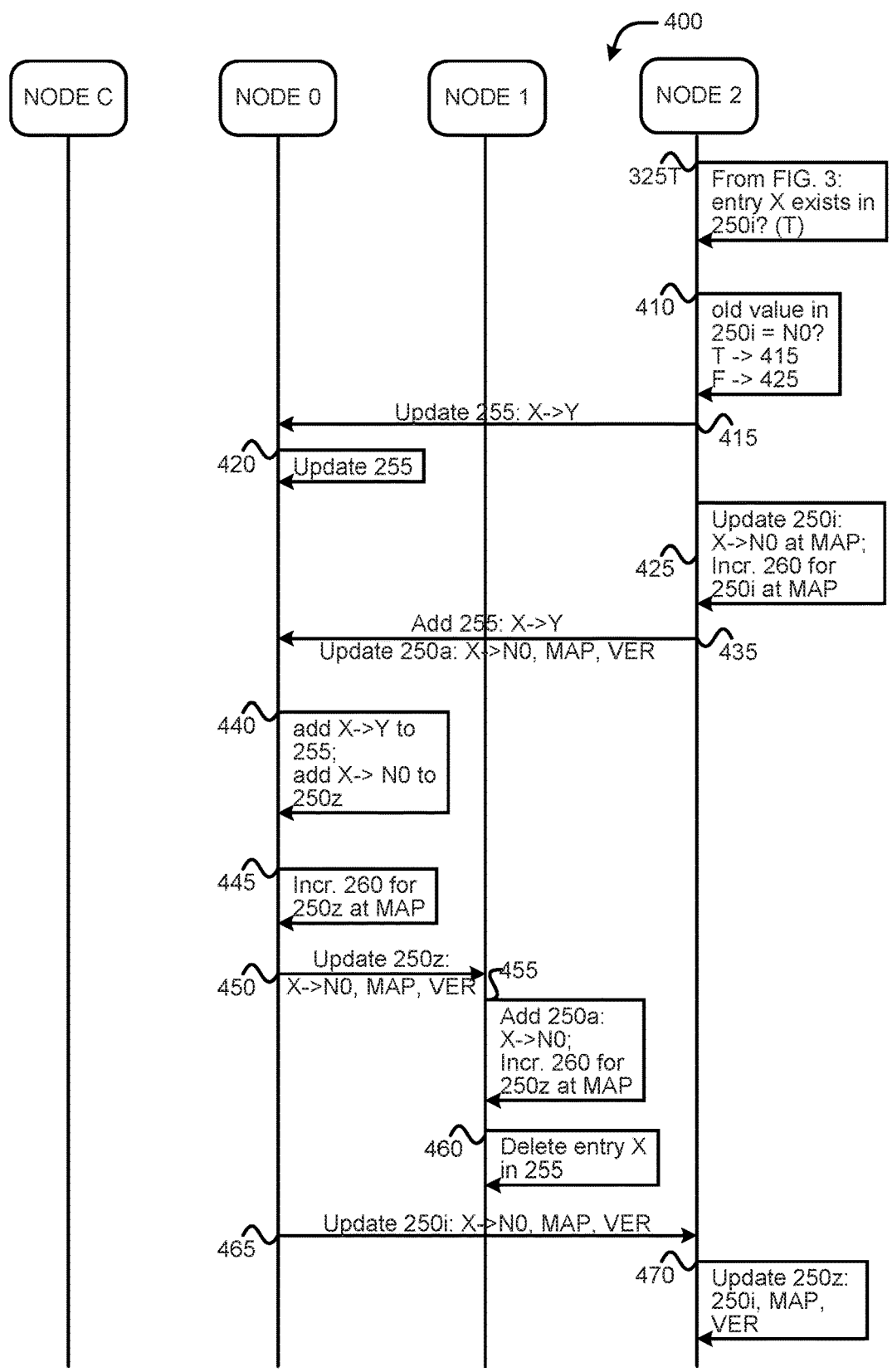
Figure 5:
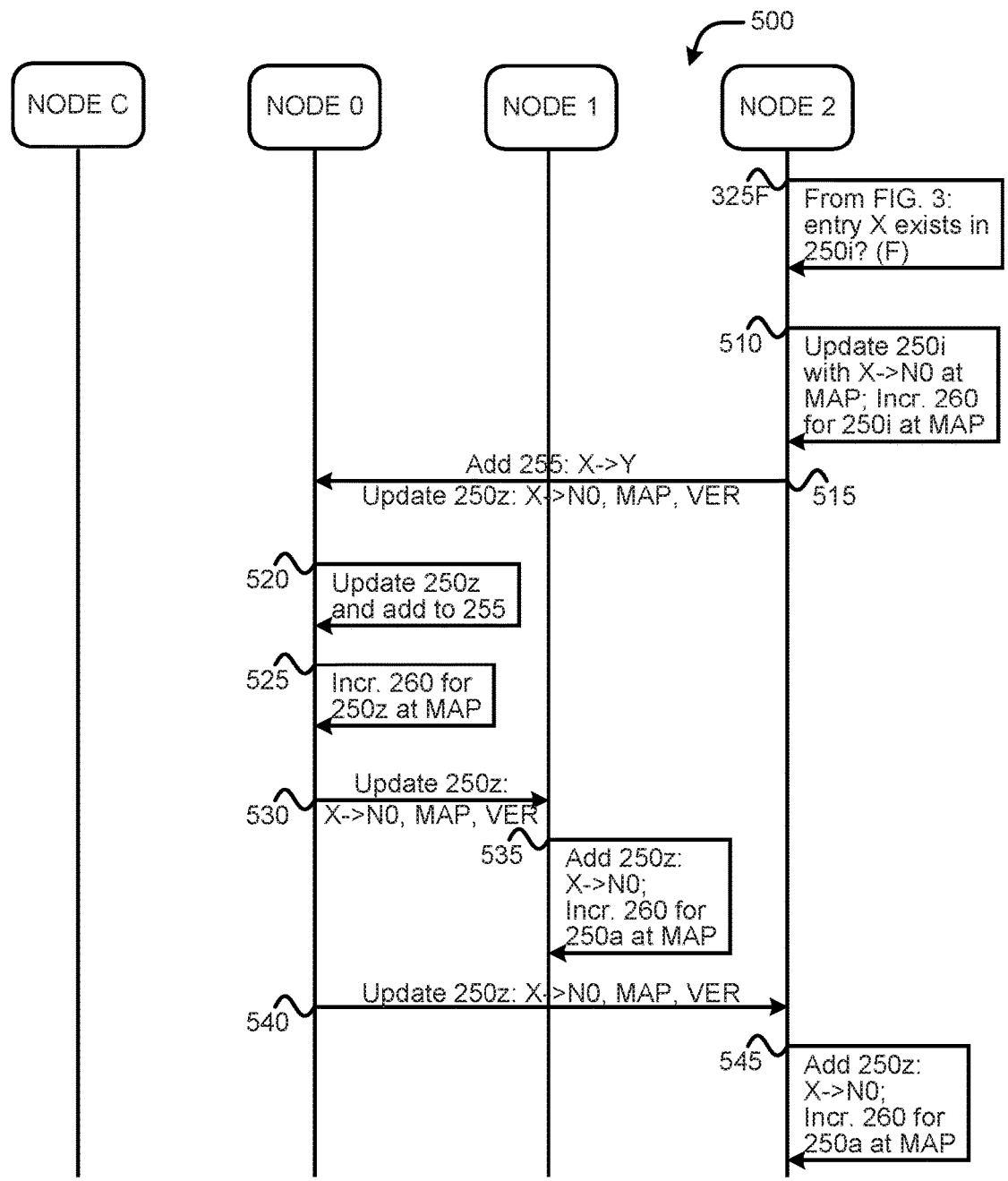

FIGS. 3-5 illustrate processes 300-500 for updating a GT 250 and an LT 255 in cluster 104 of arrangement 100, in accordance with various embodiments. For illustrative purposes, the operations of processes 300-500 are described as being performed by nodes 110 in FIG. 1, wherein a first node 110 or the source computer device 102 acts as a control node ("node C" in FIGS. 3-5), a second node 110 acts as a new handling node ("node 0" in FIGS. 3-5), a third node 110 acts as an old handling node ("node 1" in FIGS. 3-5), and a fourth node 110 acts as a node that is responsible for updating the GT 250 ("node 2" in FIGS. 3-5). While particular examples and orders of operations are illustrated in FIGS. 3-5, in various embodiments, these operations may be re-ordered, broken into additional operations, combined, and/or omitted altogether. In some embodiments, the operations illustrated in FIGS. 3-5 may be combined with operations described with regard to other embodiments, such as those illustrated by FIG. 6 and/or one or more operations described with regard to the non-limiting examples provided herein.

Referring to FIG. 3, at operations 305A-C, the control node 110A may broadcast an update message (e.g., a packet 109) to each of the nodes 110 in the cluster 104. As an example, the update message may indicate that a new key X points to port Y of new node 0 ("X→N0(Y)" in FIG. 3). In embodiments, the new key X may be a node ID associated with the new node 0, which is to act as a new handling node for packets 108 including a flow ID associated with the new node 0. In such embodiments, applying the new key X to a hash function may produce the node ID of node 0, or a combination of a port number for port Y and the node ID of node 0. At operations 310A-C, each node 110 may examine the new key X in the update message to determine whether it is responsible for updating a portion of the GT 250 that includes the new key X. Based on the update message, one node 110 may determine that it is responsible for updating the portion of the GT 250 that includes the new key X, and the other nodes 110 may discard the update message as they are not responsible for that portion of the GT 250. Thus, at operations 310A and 310B, node 0 and node 1 may, respectively, determine that they are not responsible for updating the portion of GT 250 where the new key X is to be located (e.g., indicated by "(F)" for false in FIG. 3). At operations 315A and 315B, node 0 and node 1 may, respectively, discard the update message.

At operation 310C, node 2 may determine that it is responsible for updating the portion of GT 250 where the new key is to be located (e.g., indicated by "(T)" for true in FIG. 4). In this regard, node 2 may be referred to as the "responsible node." At operation 320, the responsible node 2 may determine a mapping MAP for the new key X. In embodiments, the mapping MAP may be a hash map or associative array that maps keys to values using a hash function. In such embodiments, the responsible node 2 may apply the new key X to a hash function to obtain an index (also referred to as a "node index") that points to a location where the new value is to be stored (e.g., a memory location in memory 220). In some embodiments, the mapping MAP may be a table position in the GT 250, and the index computed using the hash function may point to the table position. At operation 325, the responsible node 2 may determine whether an entry for key X already exists in the offline GT 250i. If the responsible node 2 determines that an entry for key X does exist in the offline GT 250i ("T" for true in FIG. 3), then the responsible node 2 may proceed to process 400 depicted by FIG. 4. If the responsible node 2 determines that an entry for key X does not exist in the offline GT 250i ("F" for false in FIG. 3), then the responsible node 2 may proceed to process 500 depicted by FIG. 5.

FIG. 4 illustrates a process 400 that may be performed to replace a value in the GT 250, in accordance with various embodiments. The process 400 may be performed when a table entry for the new key X is found in the GT 250.

Referring to FIG. 4, operation 325T represents a "true" result of operation 325 of FIG. 3, where the responsible node 2 determines that an entry for the key X already exists in the offline GT 250i. At operation 410, the responsible node 2 may determine whether an old value of the entry for key X in GT 250i points to the new node 0. For example, the responsible node 2 may determine a node index using the key X (e.g., by applying key X to a hash function), which may indicate a table row where a node ID may be located in the GT 250. The responsible node 2 may then obtain the node ID located at the table row, and may determine whether the obtained node ID is equal to a node ID for node 0. If the responsible node 2 determines that the old value of the entry for key X in GT 250i does point to the new node 0 ("T" for true in FIG. 4), then the responsible node 2 may proceed to operation 415 to instruct the new node 0 to update its LT 255 with the new port value (e.g., Y). At operation 420, the new node 0 may update its locally stored LT 255 with the new port value Y.

If at operation 410 the responsible node 2 determines that the old value of the entry for key X does not point to the new node 0 ("F" for false in FIG. 4), then the responsible node 2 may proceed to operation 425 to update its own offline GT 250i. At operation 425, the responsible node 2 may update its locally stored offline GT 250i to include the node ID for new node 0 according to the mapping MAP ("X→N0 at POS" in FIG. 4), which may indicate that the new key X points to the new node 0. Additionally, the responsible node 2 may also increment (Incr.) a version counter 260 for the table entry that includes the node ID for new node 0 (also referred to as the "new node ID").

At operation 435, the responsible node 2 may send a message (e.g., a packet 109) to the new node 0, which may include an instruction to add the new port value Y of the new node 0 to an LT 255 according to the mapping MAP. This message may also include a value VER of the version counter 260 associated with the mapping MAP for the new node ID, which was incremented at operation 425. The value VER may also be referred to as a "version number", "version number VER", "version VER", and the like.

At operation 440, the new node 0 may add the new port value Y to its locally stored LT 255 based on the mapping MAP, and may add the new node ID based on the mapping MAP ("X→N0 at POS" in FIG. 4) to its locally stored online GT 250z. In embodiments, the new node 0 may apply the mapping MAP using a hash function as discussed previously, or the new node 0 may enter the new node ID to the GT 250z at a table position indicated by the mapping MAP. At operation 445, the new node 0 may increment its own version counter 260 associated with the mapping MAP when the update occurs at operation 440.

At operation 450, the new node 0 may send a message (e.g., a packet 109) to the old node 1 (as well as any other nodes 110 in the cluster 104) including an instruction to update its locally stored online GT 250z with the key-value pair (e.g., the new key X that points to the new node 0) according to the mapping MAP. This message may also include a version number VER of the version counter 260 associated with the mapping MAP. The version number VER may be the value obtained by the new node 0 at operation 435 or the version number VER may be a value of the version counter 260 stored at the new node 0. At operation 455, the old node 1 (and any other node 110 in the cluster 104 that received the message from the new node 0) may add the new node ID to a locally stored online GT 250z when the value VER in the message sent at operation 450 is greater than the current version of the online GT 250z. The old node 1 (and any other node 110 in the cluster 104 that received the message from the new node 0) may increment its own version counter 260 associated with the mapping MAP when the update occurs at operation 455. At operation 460, the old node 1 (and any other node 110 in the cluster 104 that received the message from the new node 0) may delete the entry for the key X in their corresponding LTs 255.

Additionally, at operation 465, the new node 0 may send a message (e.g., another packet 109) to the responsible node 2 to instruct the responsible node 2 to update its locally stored online GT 250z based on its locally stored offline GT 250i. In embodiments, the message sent at operation 465 may also include the mapping MAP and the version number VER. In some embodiments, the message sent at operation 465 may be the same as the message sent at operation 450, and in such embodiments, the message sent at operation 465 may be sent at a same or similar time as the message sent at operation 450. At operation 470, the responsible node 2 may update its online GT 250z based on the offline GT 250i when the version number VER matches a value of its locally stored version counter 260. In other embodiments, at operation 470, the responsible node 2 may perform the same or similar operations as the other node 1 at operation 455. In such embodiments, at operation 470 the responsible node 2 may add the new node ID to its locally stored online GT 250z when the value VER in the message sent at operation 465 is greater than the current version of the online GT 250z, and may increment its own version counter 260 associated with the mapping MAP when the update occurs at operation 470. After completion of operation 470, process 400 may end or repeat as necessary.

FIG. 5 shows a process 500 for inserting a value into the GT 250, in accordance with various embodiments. Process 500 may be performed when an entry for a new key X is not found in the GT 250.

Referring to FIG. 5, operation 325F represents a "false" result from operation 325 of FIG. 3, where the responsible node 2 determines that an entry for the key X does not exist in the offline GT 250i. At operation 510, the responsible node 2 may update its locally stored offline GT 250i to include the node ID for new node 0 according to the mapping MAP ("X→N0 at POS" in FIG. 5), which may indicate that the new key X points to the new node 0. Additionally, the responsible node 2 may also increment (Incr.) a version counter 260 for the table entry that includes the node ID for new node 0 (also referred to as the "new node ID").

At operation 515, the responsible node 2 may send a message (e.g., a packet 109) to the new node 0, which may include an instruction to add the new port value Y to an LT 255 of the new node 0 based on the mapping MAP. The message may also include an instruction to update an online GT 250z to include the new node ID based on the mapping MAP. The message may also include a value VER of the version counter 260 associated with the mapping MAP for the new node ID, which was incremented at operation 510.

At operation 520, the new node 0 may add the new port value Y to its locally stored LT 255 based on the mapping MAP, and may update its locally stored online GT 250z with the new node ID based on the mapping MAP. At operation 525, the new node 0 may increment its own version counter 260 associated with the mapping MAP when the update occurs at operation 520.

At operation 530, the new node 0 may send a message (e.g., a packet 109) to the old node 1 (as well as the other nodes 110 in the cluster 104) including an instruction to update its locally stored online GT 250z based on the mapping MAP (e.g., indicating that the new key X that points to the new node 0). The message may also include a version number VER of the version counter 260 associated with the location indicated by the mapping MAP. The version number VER may be the value obtained by the new node 0 at operation 515 or the version number VER may be a value of the version counter 260 stored at the new node 0. At operation 535, the old node 1 (and any other node 110 in the cluster 104 that received the message from the new node 0) may add the new node ID to its locally stored online GT 250z when the value VER is greater than the current version of the online GT 250z.

At operation 540, the new node 0 may send a message (e.g., a packet 109) to the responsible node 2 to instruct the responsible node 2 to update its locally stored online GT 250z based on its locally stored offline GT 250i. In some embodiments, the message sent at operation 540 may be the same as the message sent at operation 530, and in such embodiments, the message sent at operation 540 may be sent at a same or similar time as the message sent at operation 530. In embodiments, the message sent at operation 540 may also include the mapping MAP and the version number VER. At operation 545, the responsible node 2 may perform the same or similar operations as the other node 1 at operation 535, which may include adding the new node ID to its online GT 250z according to the mapping MAP when the version number VER is greater than a value of its locally stored version counter 260 associated with the online GT 250z and/or the location indicated by the mapping MAP. In other embodiments, at operation 545, the responsible node 2 may update its locally stored online GT 250z based on its offline GT 250i when the value VER in the message sent at operation 540 is equal to the current version of the offline GT 250i. In addition, at operation 545 the responsible node 2 may increment its own version counter 260 associated with location indicated by the mapping MAP when the update occurs at operation 545.

Figure 6:
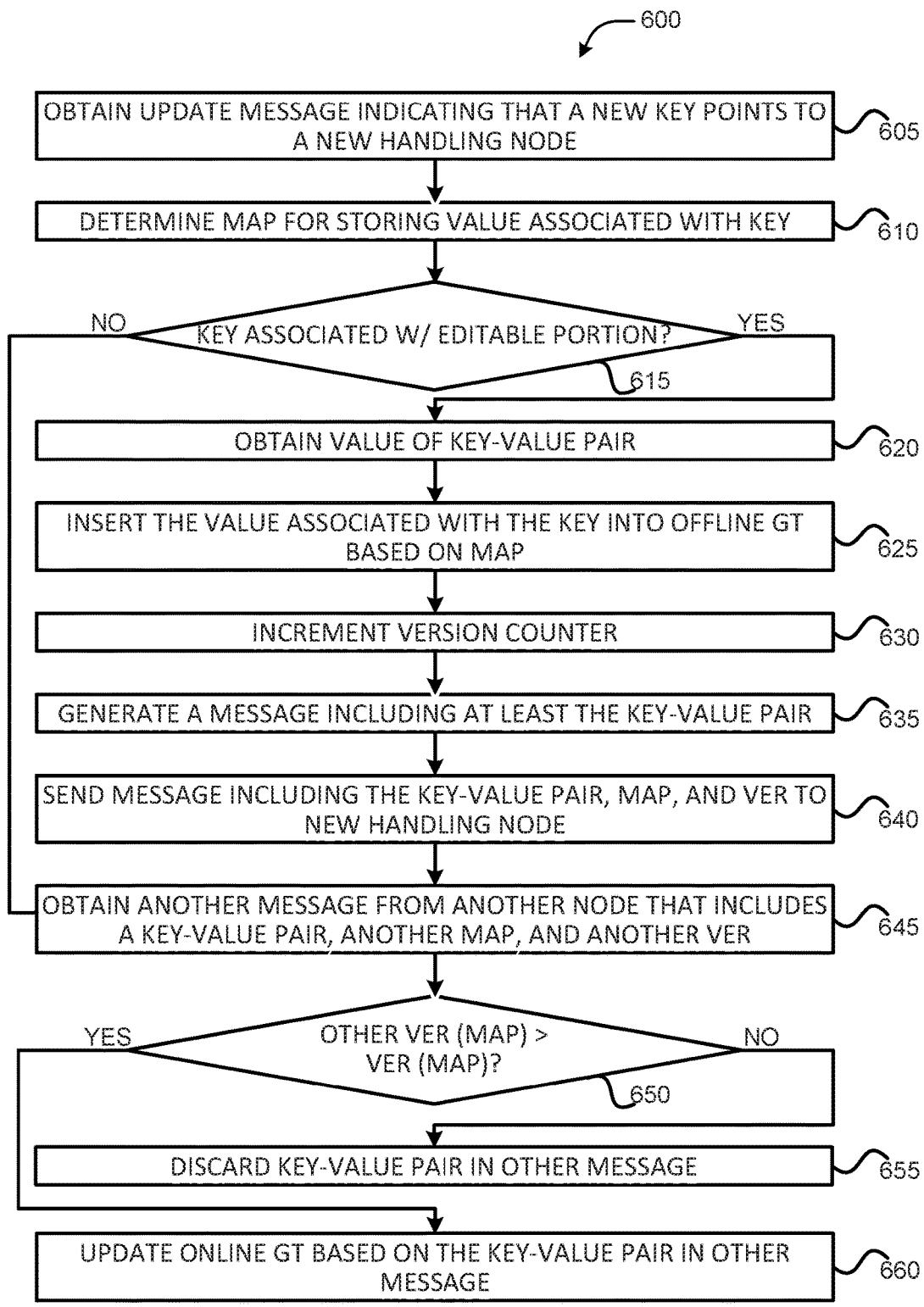
FIG. 6 illustrates another process for updating lookup tables of nodes in a cluster, in accordance with various embodiments.

FIG. 6 illustrates a process 600 for updating a GT 250 and/or LT 255, in accordance with various embodiments. For illustrative purposes, the operations of process 600 is described as being performed by various elements of a node 110, as discussed with regard to FIGS. 1-2. While particular examples and orders of operations are illustrated in FIG. 6, in various embodiments, these operations may be re-ordered, broken into additional operations, combined, and/or omitted altogether. In some embodiments, the operations illustrated in FIG. 6 may be combined with operations described with regard to other embodiments, such as those illustrated by one or more of FIGS. 3-5 and/or one or more operations described with regard to the non-limiting examples provided herein.

Referring to FIG. 6, at operation 605, the NIC 225 of the node 110 may obtain an update message (e.g., a packet 109) indicating that a new key is to point to a new handling node 110. In embodiments, this message may indicate a key-value pair including a node ID of the new handling node as the value and a flow ID as the key. At operation 610, the processor circuitry 215 of node 110 may implement a GT manager 245 to determine a mapping (MAP) for storing the value (e.g., the new node ID) associated with the key. This may be done by performing a hash operation on the key to obtain an index (e.g., a node index), where the index may indicate a memory location and/or a row or table element for storing the value of the key-value pair.

At operation 615, the processor circuitry 215 may implement a GT manager 245 to determine whether the key is associated with a portion of the GT 250 that the node 110 is responsible for editing/manipulating (i.e., an editable portion of the GT 250). In embodiments, the GT manager 245 may determine whether the new key is associated with its editable portion of the GT 250 based on the MAP. If the MAP is within a portion of the GT 250 that the node 110 is responsible for editing, then the GT manager 245 may determine that the node 110 is responsible for updating the GT 250 based on the new key. Other procedures for determining whether the node 110 is the responsible node may be used.

If at operation 615, the GT manager 245 determines that the key is not associated with the editable portion of the GT 250, then the GT manager 245 may proceed to operation 645 to obtain a message from another node. In this regard, the GT manager 245 may determine that the node 110 is not the responsible node. If at operation 615, the GT manager 245 determines that the key is associated with the editable portion of the GT 250, then the GT manager 245 may proceed to operation 620 to obtain the value associated with the key. In this regard, the GT manager 245 may determine that the node 110 is the responsible node.

At operation 620, the processor circuitry 215 may implement the GT manager 245 to obtain the value of the key-value pair from the message obtained at operation 605. At operation 625, the processor circuitry 215 may implement the GT manager 245 to insert the value associated with the key into an offline version of the GT 250 ("GT 250*i*") based on the MAP. As discussed previously, the GT manager 245 may apply a hash function to the key to obtain an index pointing to a memory location or a table position where the value of the key-value pair is located in the GT 250 or should be stored. At operation 625, the GT manager 245 may check to see if the GT 250*i* already includes a value at the POS. In embodiments, when the GT 250*i* already includes an entry for the key according to the MAP, the GT manager 245 may replace the current entry in the GT 250*i* with the new value based on the MAP. In embodiments, when the GT 250*i* does not include an entry for the key, the GT manager 245 may create a new entry (e.g., a memory location or a table element) in the GT 250*i* for the value and insert the new value into the newly created entry. At operation 630, the processor circuitry 215 may implement the GT manager 245 to increment a version counter 260 associated with the entry in which the node ID was stored.

At operation 635, the processor circuitry 215 may implement the GT manager 245 to generate a message (e.g., a packet 109) including at least the key-value pair. In embodiments, the message may also include a value of the version counter 260 (VER) and the MAP. However, in some embodiments, the message may only include the value of the key-value pair, such as when the GT manager 245 determines at operations 620-625 that the already existing value in the offline GT 250*i* equals the new value of the key-value pair. At operation 640, the NIC 230 may send the generated message to the new handling node 110. In embodiments, the new handling node 110 may update its locally stored version of the online GT 250*z* and/or a locally stored LT 255 based on the instructions in this message.

At operation 645, the NIC 225 may obtain another message (e.g., a packet 109) from another node indicating the key-value pair, another MAP, and another VER associated with the other MAP. In embodiments, this message may be obtained from the new node 110 after the updates were applied at the new handling node 110. When the node 110 is the responsible node, the node 110 may use the information indicated by this message to activate the updates to the GT 250*z* by applying the updates to the offline GT 250*i* (e.g., made at operation 625) to the online GT 250*z*. When the node 110 is not the responsible node and did not perform operations 620-640, the node 110 may use the information indicated by this message to update its online GT 250*z* based on the information included in the other message. In some embodiments, when the node 110 is the responsible node, the node 110 may update its online GT 250*z* based on the information included in the other message rather than using the updated offline GT 250*i*.

At operation 650, the processor circuitry 215 may implement the GT manager 245 to determine whether the other VER at the other MAP ("other VER(MAP)") is greater than a current VER for the MAP ("VER(MAP)") of the offline GT 250*i* or online GT 250*z*. If at operation 650 the GT manager 245 determines that the other VER(MAP) is not greater than (e.g., less than) the current VER(MAP), then the GT manager 245 may proceed to operation 655 to discard the obtained key-value pair. In embodiments where the responsible node is to update the online GT 250*z* based on the offline GT 250*i*, the processor circuitry 215 may implement the GT manager 245 to update the online GT 250*z* based on the offline GT 250*i* when the other VER(MAP) is equal to the current VER(MAP).

If at operation 650 the GT manager 245 determines that the other VER(MAP) is greater than the current VER(MAP), then the GT manager 245 may proceed to operation 660 to update the online GT 250*z* based on the obtained key-value pair, which was included in the other message received at operation 645. In embodiments, the GT manager 245 may insert the value (e.g., node ID) of the obtained key-value pair into a table entry of the offline GT 250*i* at a table position indicated by the MAP or may store the value in a memory location indicated by the MAP. After completion of operation 660, the process 600 may end or repeat as necessary.

Illustrative examples of the devices, systems, and methods disclosed herein are provided below. An embodiment of the devices, systems, and methods may include any one or more, and any combination of, the examples described below.

Example 1 may include an apparatus to be implemented as a node in a cluster, the apparatus comprising: a memory to store two versions of a global lookup table (GT) including an online version of the GT and an offline version of the GT, wherein the GT maps keys to values of key-value pairs and is replicated across each node in the cluster, and the node is permitted to modify a first portion of the offline version of the GT at the node; and a GT manager to determine whether a new value is to be stored in a key-value pair in the first portion, update the key-value pair in the offline version of the GT of the node with the new value when the new value is to be stored in the key-value pair in the first portion, update the online version of the GT of the node based on the offline version of the GT of the node, and update the online version of the GT of the node based on an obtained key-value pair when the new value is to be stored in a second portion of the GT that the node is not permitted to modify, wherein the obtained key-value pair indicates the key and the new value.

Example 2 may include the apparatus of example 1 and/or one or more other examples herein, wherein the node is a first node, the offline version is a first offline version, and the apparatus further comprises: a communications interface to obtain a first message at least indicating the key of the key-value pair, and obtain a second message from a second node in the cluster, wherein the second message is to indicate the key-value pair, and wherein the key-value pair is based on a second offline version of the GT at the second node.

Example 3 may include the apparatus of example 2 and/or one or more other examples herein, wherein, when the key is to be stored in the first portion, the GT manager is to: determine a mapping for storage of the new value in the first portion based on the key; insert the new value into the first offline version based on the mapping, wherein to insert the new value into the first offline version, the GT manager is to: create a new entry for the new value in the first offline version when the first offline version does not include an entry for the key; and replace a current entry in the first offline version with the new value when the first offline version does include an entry for the key.

Example 4 may include the apparatus of example 3 and/or one or more other examples herein, wherein the new value is a node identifier of a third node in the cluster, and wherein, when the new value is to be stored in the key-value pair in the first portion, the GT manager is further to: generate a third message indicating the key-value pair and the determined mapping, and wherein the communications interface is to send the third message to the third node using the node identifier, wherein the third node is to update a locally stored local lookup table (LT) to include at least the new value of the key-value pair, wherein the locally stored LT is to be used during a second-level lookup operation of a two level lookup procedure.

Example 5 may include the apparatus of example 4 and/or one or more other examples herein, wherein, when the new value is to be stored in the key-value pair in the first portion, the GT manager is further to: increment a version counter associated with the first offline version after the new value is inserted into the first offline version; and generate the third message to further include a value of the version counter.

Example 6 may include the apparatus of example 5 and/or one or more other examples herein, wherein the online version of the GT at the node is a first online version, the second node includes a second online version of the GT at the second node, and wherein: the communications interface is to obtain a fourth message from the third node, wherein the fourth message is to indicate that the third node has updated a third online version of the GT at the third node, a version number of the third online version, and another mapping for the key in the third online version; and the GT manager is to update the first online version based on the first offline version when the version number of the third online version is greater than the value of the version counter and the other mapping is equal to the determined mapping.

Example 7 may include the apparatus of example 2 and/or one or more other examples herein, wherein the memory is further to store a local lookup table (LT), and wherein, to update the online version of the GT of the node based on the obtained key-value pair, the GT manager is to: identify a mapping for storage of the new value; control storage of the new value in the LT according to the mapping; control storage of the new value in the online version according to the mapping, wherein, to control storage of the new value in the online version, the GT manager is to: create a new entry for the key when a current entry for the key does not exist in the online version; and replace contents of a current entry with the new value when the current entry for the key exists in the online version.

Example 8 may include the apparatus of example 7 and/or one or more other examples herein, wherein the second message is to further indicate the mapping for storage of the new value and a version number associated with the second offline version.

Example 9 may include the apparatus of example 8 and/or one or more other examples herein, wherein the GT manager is to: implement a version counter associated with the online version or the identified mapping; control storage of the new value in the online version when the version number associated with the second offline version is greater than a value of the version counter; and increment the version counter after storage of the new value in the online version.

Example 10 may include the apparatus of example 9 and/or one or more other examples herein, wherein the version counter is a first version counter, and the version number associated with the second offline version is based on a value of a second version counter implemented by the second node.

Example 11 may include the apparatus of example 9 and/or one or more other examples herein, wherein: the GT manager is further to generate a fifth message after storage of the new value in the online version of the GT at the node, wherein the fifth message is to indicate the key-value pair, the identified mapping, and the value of the first version counter; and the communications interface is to broadcast the fifth message to each node in the cluster including the second node.

Example 12 may include the apparatus of example 11 and/or one or more other examples herein, wherein: the GT manager is further to generate a sixth message after storage of the new value in the online version of the GT at the node, wherein the sixth message is to indicate the key-value pair, the identified mapping, the value of the first version counter, and an instruction to delete an LT entry in the LT for the key; and the communications interface is to broadcast the sixth message to each node in the cluster except the second node.

Example 13 may include the apparatus of examples 7-12 and/or one or more other examples herein, further comprising: a lookup engine to perform, in response to receipt of a packet, a lookup operation on the online version at the node to obtain a node identifier of a handling node in the cluster, wherein the node identifier is a value of a key-value pair in the online version; and wherein the communications interface is to send the packet to the node associated with the node identifier.

Example 14 may include the apparatus of example 13 and/or one or more other examples herein, wherein the first message is obtained from a control node, and wherein the first message is broadcast to each node in the cluster.

Example 15 may include the apparatus of examples 1-12 or 14 and/or one or more other examples herein, wherein each node in the cluster is permitted to modify a corresponding portion of the GT, wherein each corresponding portion of the GT has a size of 1/N, where N is a number of nodes in the cluster.

Example 16 may include the apparatus of examples 4-6 and/or one or more other examples herein, wherein each of the first node, the second node, and the third node are implemented in separate server computer devices, and wherein the cluster is implemented in a data center or a core network of a mobile network operator.

Example 17 may include one or more computer readable media including instructions, which when executed by a node, causes the node to: determine whether a new value is to be stored in a key-value pair in a first portion of a global lookup table (GT), wherein the node includes two locally stored versions of the GT including an online version of the GT and an offline version of the GT, wherein the GT maps keys to values of key-value pairs and is replicated across each node in the cluster, and the node is permitted to modify a first portion of the GT; update the key-value pair in the offline version of the GT of the node with the new value when the new value is to be stored in the key-value pair in the first portion; update the online version of the GT at the node based on the offline version of the GT at the node; update the online version of the GT based on an obtained key-value pair when the new value is to be stored in a second portion of the GT that the node is not permitted to modify, wherein the obtained key-value pair indicates a key and the new value; and perform, for an obtained packet, a first-level lookup operation of a two-level lookup scheme on the updated online version of the GT at the node.

Example 18 may include the one or more computer readable media of example 17 and/or one or more other examples herein, wherein the node is a first node, the offline version of the GT at the node is a first offline version, and in response to execution of the instructions, the node is to: obtain a first message at least indicating the key of the key-value pair; and obtain a second message from a second node in the cluster, wherein the second message is to indicate the key-value pair, and wherein the key-value pair is based on a second offline version of the GT at the second node.

Example 19 may include the one or more computer readable media of example 18 and/or one or more other examples herein, wherein, when the new value is to be stored in the key-value pair in the first portion, the node, in response to execution of the instructions, is to: determine a mapping for storage of the new value in the first portion based on the key; insert the new value into the first offline version based on the mapping, wherein to insert the key into the first offline version, the node, in response to execution of the instructions, is to: create a new entry for the new value in the first offline version when the first offline version does not include an entry for the key; and replace contents of a current entry in the first offline version with the new value when the first offline version does include an entry for the key.

Example 20 may include the one or more computer readable media of example 19 and/or one or more other examples herein, wherein, when the new value is to be stored in the key-value pair in the first portion, the node, in response to execution of the instructions, is to: generate a third message indicating the key-value pair and the determined mapping; and control transmission of the third message to the third node in the cluster using the new value, wherein the new value is a node identifier of the third node, wherein the third node is to update a locally stored local lookup table (LT) to include at least the new value of the key-value pair, and wherein the locally stored LT is to be used during a second-level lookup operation of a two-level lookup procedure.

Example 21 may include the one or more computer readable media of example 20 and/or one or more other examples herein, wherein, when the new value is to be stored in the key-value pair in the first portion, the node, in response to execution of the instructions, is to: increment a version counter associated with the first offline version after the new value is inserted into the first offline version; and generate the third message to further include a value of the version counter.

Example 22 may include the one or more computer readable media of example 21 and/or one or more other examples herein, wherein the online version of the GT at the node is a first online version, the second node includes a second online version of the GT, and the node, in response to execution of the instructions, is to: obtain a fourth message from the third node, wherein the fourth message is to indicate that the third node has updated a third online version of the GT at the third node, a version number of the third online version, and another mapping for the key in the third online version; and update the first online version based on the first offline version when the version number of the third online version is greater than the value of the version counter and the other mapping is equal to the determined mapping.

Example 23 may include the one or more computer readable media of example 18 and/or one or more other examples herein, wherein, to update the first offline version based on the key-value pair, the node, in response to execution of the instructions, is to: identify a mapping for storage of the new value; control storage of the new value in a local lookup table (LT) based on the mapping, wherein the node is to include the LT; control storage of the new value in the online version based on the mapping, wherein, to control storage of the new value, the node, in response to execution of the instructions, is to: create a new entry for the key when a current entry for the key does not exist in the first offline version; and replace contents of a current entry with the new value when a current entry for the key exists in the first offline version; and update the online version of the GT at the node based on the first offline version.

Example 24 may include the one or more computer readable media of example 23 and/or one or more other examples herein, wherein the second message is to further indicate the mapping for storage of the new value and a version number associated with the second offline version.

Example 25 may include the one or more computer readable media of example 24 and/or one or more other examples herein, wherein the node, in response to execution of the instructions, is to: implement a version counter associated with the online version or the identified mapping;

control storage of the new value in the online version when the version number associated with the second offline version is greater than a value of the version counter; and increment the version counter after storage of the new value in the online version.

Example 26 may include the one or more computer readable media of example 25 and/or one or more other examples herein, wherein the version counter is a first version counter, and the version number associated with the second offline version is based on a value of a second version counter implemented by the second node.

Example 27 may include the one or more computer readable media of example 25 or 27 and/or one or more other examples herein, wherein the node, in response to execution of the instructions, is to: generate a fifth message after storage of the new value in the online version of the GT at the node, wherein the fifth message is to indicate the key-value pair, the identified mapping, and the value of the first version counter; and control transmission of the fifth message to each node in the cluster including the second node.

Example 28 may include the one or more computer readable media of example 27 and/or one or more other examples herein, wherein the node, in response to execution of the instructions, is to: generate a sixth message after storage of the new value in the online version of the GT at the node, wherein the sixth message is to indicate the key-value pair, the identified mapping, the value of the first version counter, and an instruction to delete an LT entry in the LT for the key; and control transmission of the sixth message to each node in the cluster except the second node.

Example 29 may include the one or more computer readable media of examples 23-28 and/or one or more other examples herein, wherein the node, in response to execution of the instructions, is to: perform, in response to receipt of a packet, a lookup operation on the online version at the node to obtain a node identifier of a handling node in the cluster, wherein the node identifier is a value of a key-value pair in the online version; and control transmission of the packet to the node associated with the node identifier.

Example 30 may include the one or more computer readable media of example 29 and/or one or more other examples herein, wherein the first message is obtained from a control node in the cluster, and wherein the first message is broadcast to each node in the cluster.

Example 31 may include the one or more computer readable media of examples 17-28 or 30 and/or one or more other examples herein, wherein each node in the cluster is permitted to modify a corresponding portion of the GT, wherein each corresponding portion of the GT has a size of 1/N, where N is a number of nodes in the cluster.

Example 32 may include the one or more computer readable media of examples 20-22 and/or one or more other examples herein, wherein each of the first node, the second node, and the third node are implemented in separate server computer devices, and wherein the cluster is implemented in a data center or a core network of a mobile network operator.

Example 33 may include a method to be performed by a node in a cluster for updating a global table (GT) used in a two-level lookup scheme, the method comprising: obtaining, by the node, a first message indicating a key of a key-value pair to be used for forwarding packets to a handling node in the cluster for a second-level lookup operation of the two-level lookup scheme; determining, by the node, whether a new value is to be stored in a key-value pair in a first portion of a global lookup table (GT), wherein the node includes two locally stored versions of the GT including an online version of the GT and an offline version of the GT, wherein the GT maps keys to values of key-value pairs and is replicated across each node in the cluster, and the node is permitted to modify a first portion of the GT; updating, by the node, the key-value pair in the offline version of the GT of the node with the new value when the new value is to be stored in the key-value pair in the first portion; updating, by the node, the online version of the GT at the node based on the offline version of the GT at the node; obtaining, by the node, a second message from a second node in the cluster, wherein the second message is to indicate a key-value pair, and wherein the key-value pair is based on a second offline version of the GT at the second node; updating, by the node, the online version of the GT based on an obtained key-value pair when the new value is to be stored in a second portion of the GT that the node is not permitted to modify, wherein the obtained key-value pair indicates a key and the new value; and performing, by the node for an obtained packet, a first-level lookup operation on the updated online version.

Example 34 may include the method of example 33 and/or one or more other examples herein, wherein, when the new value is to be stored in the key-value pair in the first portion, the method comprises: determining, by the node, a mapping for storage of the new value in the first portion based on the key; inserting, by the node, the new value into the first offline version based on the mapping, wherein inserting the key into the first offline version comprises: creating, by the node, a new entry for the new value in the first offline version when the first offline version does not include an entry for the key; and replacing, by the node, contents of a current entry in the first offline version with the new value when the first offline version does include an entry for the key.

Example 35 may include the method of example 34 and/or one or more other examples herein, wherein, when the new value is to be stored in the key-value pair in the first portion, the method comprises: generating, by the node, a third message indicating the key-value pair and the determined mapping; and transmitting, by the node, the third message to the third node in the cluster using the new value, wherein the new value is a node identifier of the third node, wherein the third node is to update a locally stored local lookup table (LT) to include at least the new value of the key-value pair, and wherein the locally stored LT is to be used during a second-level lookup operation of a two-level lookup procedure.

Example 36 may include the method of example 35 and/or one or more other examples herein, wherein, when the new value is to be stored in the key-value pair in the first portion, the method comprises: incrementing, by the node, a version counter associated with the first offline version after the new value is inserted into the first offline version; and generating, by the node, the third message to further include a value of the version counter.

Example 37 may include the method of example 36 and/or one or more other examples herein, wherein the online version of the GT at the node is a first online version, the second node includes a second online version of the GT, and the method comprises: obtaining, by the node, a fourth message from the third node, wherein the fourth message is to indicate that the third node has updated a third online version of the GT at the third node, a version number of the third online version, and another mapping for the key in the third online version; and updating, by the node, the first online version based on the first offline version when the version number of the third online version is greater than the value of the version counter and the other mapping is equal to the determined mapping.

Example 38 may include the method of example 33 and/or one or more other examples herein, wherein, updating the first offline version based on the key-value pair comprises: identifying, by the node, a mapping for storage of the new value; storing, by the node, the new value in a local lookup table (LT) based on the mapping, wherein the node is to include the LT; storing, by the node, the new value in the online version based on the mapping, wherein, storing the new value comprises: create a new entry for the key when a current entry for the key does not exist in the first offline version; and replace contents of a current entry with the new value when a current entry for the key exists in the first offline version; and update the online version of the GT at the node based on the first offline version.

Example 39 may include the method of example 38 and/or one or more other examples herein, wherein the second message is to further indicate the mapping for storage of the new value and a version number associated with the second offline version, and wherein the method further comprises: implementing, by the node, a version counter associated with the online version or the identified mapping; storing, by the node, the new value in the online version when the version number associated with the second offline version is greater than a value of the version counter; and incrementing, by the node, the version counter after storage of the new value in the online version.

Example 40 may include the method of example 39 and/or one or more other examples herein, wherein the version counter is a first version counter, and the version number associated with the second offline version is based on a value of a second version counter implemented by the second node.

Example 41 may include the method of example 39 and/or one or more other examples herein, further comprising: generating, by the node, a fifth message after storage of the new value in the online version of the GT at the node, wherein the fifth message is to indicate the key-value pair, the identified mapping, and the value of the first version counter; and transmitting, by the node, the fifth message to each node in the cluster including the second node.

Example 42 may include the method of example 39 or 41 and/or one or more other examples herein, further comprising: generating, by the node, a sixth message after storage of the new value in the online version of the GT at the node, wherein the sixth message is to indicate the key-value pair, the identified mapping, the value of the first version counter, and an instruction to delete an LT entry in the LT for the key; and transmitting, by the node, the sixth message to each node in the cluster except the second node.

Example 43 may include the method of examples 38-42 and/or one or more other examples herein, further comprising: performing, by the node in response to receipt of a packet, a lookup operation on the online version at the node to obtain a node identifier of a handling node in the cluster, wherein the node identifier is a value of a key-value pair in the online version; sending, by the node, the packet to the node associated with the node identifier; performing, by the node in response to receipt of another packet, a lookup operation on the LT to obtain information to be used to process the other packet; processing, by the node, the other packet based on the obtained information; and sending, by the node, the other packet to a destination device or an intermediary node based on the processing of the other packet.

Example 44 may include the method of example 43 and/or one or more other examples herein, wherein the first message is obtained from a control node in the cluster, and wherein the first message is broadcast to each node in the cluster.

Example 45 may include the method of examples 33-42 or 44 and/or one or more other examples herein, wherein each node in the cluster is permitted to modify a corresponding portion of the GT, wherein each corresponding portion of the GT has a size of 1/N, where N is a number of nodes in the cluster.

Example 46 may include the method of examples 35-37 and/or one or more other examples herein, wherein each of the first node, the second node, and the third node are implemented in separate server computer devices, and wherein the cluster is implemented in a data center or a core network of a mobile network operator.

Example 47 may include one or more computer readable media including instructions, which when executed by a node, causes the node to perform the method of any one of examples 33-46.

Example 48 may include an apparatus to be implemented as a node in a cluster, the apparatus comprising: storage means for storing two versions of a global lookup table (GT) including an online version of the GT and an offline version of the GT, wherein the GT maps keys to values of key-value pairs and is replicated across each node in the cluster, and the node is permitted to modify a first portion of the offline version of the GT at the node; and GT management means for: determining whether a new value is to be stored in a key-value pair in the first portion, updating the key-value pair in the offline version of the GT of the node with the new value when the new value is to be stored in the key-value pair in the first portion, updating the online version of the GT of the node based on the offline version of the GT of the node, updating the online version of the GT of the node based on an obtained key-value pair when the new value is to be stored in a second portion of the GT that the node is not permitted to modify, wherein the obtained key-value pair indicates the key and the new value.

Example 49 may include the apparatus of example 48 and/or one or more other examples herein, wherein the node is a first node, the offline version is a first offline version, and the apparatus further comprises: communications means for obtaining a first message at least indicating the key of the key-value pair, and obtain a second message from a second node in the cluster, wherein the second message is to indicate the key-value pair, and wherein the key-value pair is based on a second offline version of the GT at the second node.

Example 50 may include the apparatus of example 49 and/or one or more other examples herein, wherein, when the key is to be stored in the first portion, the GT management means is for: determining a mapping for storage of the new value in the first portion based on the key; inserting the new value into the first offline version based on the mapping, wherein to insert the new value into the first offline version, the GT management means is for: creating a new entry for the new value in the first offline version when the first offline version does not include an entry for the key; and replacing a current entry in the first offline version with the new value when the first offline version does include an entry for the key.

Example 51 may include the apparatus of example 50 and/or one or more other examples herein, wherein the new value is a node identifier of a third node in the cluster, and wherein, when the new value is to be stored in the key-value pair in the first portion, GT management means is for: generating a third message indicating the key-value pair and the determined mapping, and wherein the communications means is for sending the third message to the third node using the node identifier, wherein the third node is to update a locally stored local lookup table (LT) to include at least the new value of the key-value pair, wherein the locally stored LT is to be used during a second-level lookup operation of a two level lookup procedure.

Example 52 may include the apparatus of example 51 and/or one or more other examples herein, wherein, when the new value is to be stored in the key-value pair in the first portion, the GT management means is for: incrementing a version counter associated with the first offline version after the new value is inserted into the first offline version; and generating the third message to further include a value of the version counter.

Example 53 may include the apparatus of example 52 and/or one or more other examples herein, wherein the online version of the GT at the node is a first online version, the second node includes a second online version of the GT at the second node, and wherein: the communications means is for obtaining a fourth message from the third node, wherein the fourth message is to indicate that the third node has updated a third online version of the GT at the third node, a version number of the third online version, and another mapping for the key in the third online version; and the GT management means is for updating the first online version based on the first offline version when the version number of the third online version is greater than the value of the version counter and the other mapping is equal to the determined mapping.

Example 54 may include the apparatus of example 49 and/or one or more other examples herein, wherein the storage means is further for storing a local lookup table (LT), and wherein, to update the online version of the GT of the node based on the obtained key-value pair, the GT management means is for: identifying a mapping for storage of the new value; controlling storage of the new value in the LT according to the mapping; controlling storage of the new value in the online version according to the mapping, wherein, to control storage of the new value in the online version, the GT management means is for: creating a new entry for the key when a current entry for the key does not exist in the online version; and replacing contents of a current entry with the new value when the current entry for the key exists in the online version.

Example 55 may include the apparatus of example 54 and/or one or more other examples herein, wherein the second message is to further indicate the mapping for storage of the new value and a version number associated with the second offline version.

Example 56 may include the apparatus of example 55 and/or one or more other examples herein, wherein the GT management means is for: implementing a version counter associated with the online version or the identified mapping; controlling storage of the new value in the online version when the version number associated with the second offline version is greater than a value of the version counter; and incrementing the version counter after storage of the new value in the online version.

Example 57 may include the apparatus of example 56 and/or one or more other examples herein, wherein the version counter is a first version counter, and the version number associated with the second offline version is based on a value of a second version counter implemented by the second node.

Example 58 may include the apparatus of example 56 and/or one or more other examples herein, wherein: the GT management means is for generating a fifth message after storage of the new value in the online version of the GT at the node, wherein the fifth message is to indicate the key-value pair, the identified mapping, and the value of the first version counter; and the communications means is for broadcasting the fifth message to each node in the cluster including the second node.

Example 59 may include the apparatus of example 58 and/or one or more other examples herein, wherein: the GT management means is for generating a sixth message after storage of the new value in the online version of the GT at the node, wherein the sixth message is to indicate the key-value pair, the identified mapping, the value of the first version counter, and an instruction to delete an LT entry in the LT for the key; and the communications means is for broadcasting the sixth message to each node in the cluster except the second node.

Example 60 may include the apparatus of examples 54-59 and/or one or more other examples herein, further comprising: lookup means for performing, in response to receipt of a packet, a lookup operation on the online version at the node to obtain a node identifier of a handling node in the cluster, wherein the node identifier is a value of a key-value pair in the online version; and wherein the communications means is for sending the packet to the node associated with the node identifier.

Example 61 may include the apparatus of example 60 and/or one or more other examples herein, wherein the first message is obtained from a control node, and wherein the first message is broadcast to each node in the cluster.

Example 62 may include the apparatus of examples 48-59 or 61 and/or one or more other examples herein, wherein each node in the cluster is permitted to modify a corresponding portion of the GT, wherein each corresponding portion of the GT has a size of 1/N, where N is a number of nodes in the cluster.

Example 63 may include the apparatus of examples 51-53 and/or one or more other examples herein, wherein each of the first node, the second node, and the third node are implemented in separate server computer devices, and wherein the cluster is implemented in a data center or a core network of a mobile network operator.

Example 64 may include an apparatus to be implemented as a node in a cluster of a plurality of nodes, the apparatus comprising: a global lookup table (GT) manager to: identify, from a control message, a new key that points to a new handling node in the cluster, and generate an update message to indicate the new key and instruct a node in the cluster to update a locally stored version of a GT to include the new key, wherein the GT maps keys to values of key-value pairs and is replicated across each node in the cluster, and wherein the new handling node is to perform a second-level lookup operation in a two-level lookup scheme; and a communications interface to obtain the control message, and broadcast the update message to each node in the cluster.

Example 65 may include the apparatus of example 64 and/or one or more other examples herein, wherein the control message is to designate the node as the control node.

Example 66 may include the apparatus of example 64 and/or one or more other examples herein, wherein the communications interface is to obtain the control message from a computer device outside of the cluster.

Example 67 may include the apparatus of examples 64-66 and/or one or more other examples herein, further comprising: a memory to store two versions of the GT including an online version of the GT and an offline version of the GT, and wherein the node is permitted to modify a first portion of the GT and is not permitted to modify other portions of the GT, and wherein the GT manager is to: determine whether a new value is to be stored in a key-value pair in the first portion of the GT at the node, update the offline version of the GT at the node with the new value when the new value is to be stored in the key-value pair in the first portion of the GT, update the online version of the GT at the node based on the offline version of the GT at the node, and update the offline version of the GT at the node based on an obtained key-value pair when the new value is to be stored in a second portion of the GT, wherein the obtained key-value pair indicates the new key and the new value.

Example 67X may include the apparatus of example 67 and/or one or more other examples herein, wherein the GT manager, memory, and communications interface are to perform the functions, processes, procedures, and operations of examples 1-16.

Example 68 may include a method to be performed by a node in a cluster of a plurality of nodes, the method comprising: obtaining, by the node, a control message to indicate that a global lookup table (GT) is to be updated based on a new key, wherein the GT maps keys to values of key-value pairs and is replicated across each node in the cluster, and wherein the GT is to be used for a first-level lookup operation in a two-level lookup scheme; identifying, by the node, a new handling node in the cluster to which the new key points, wherein the new handling node is to perform a second-level lookup operation in the two-level lookup scheme; generating, by the node, an update message to indicate the new key and to instruct another node in the cluster to update distributed locally stored version of the GT based on the new key; and broadcasting, by the node, the update message to each node in the cluster.

Example 69 may include the method of example 68 and/or one or more other examples herein, wherein the control message is to designate the node as a control node, and the other node is a node that is permitted to update a corresponding portion of the GT independent of other nodes in the cluster.

Example 70 may include the method of example 68 and/or one or more other examples herein, wherein the control message is to be obtained from a computer device outside of the cluster.

Example 71 may include the method of examples 68-70 and/or one or more other examples herein, further comprising: storing, by the node in a local memory, two versions of the GT including an online version of the GT and an offline version of the GT, wherein the online version of the GT is to be used for the first-level lookup operation, and wherein the node is permitted to modify a first portion of the GT at the node and is not permitted to modify other portions of the GT at the node; determining, by the node, whether the new value is to be stored in the first portion of the GT; updating, by the node, the offline version of the GT at the node with the new value when the new key points to a table entry in the first portion of the GT; updating, by the node, the online version of the GT at the node based on the offline version of the GT at the node; and updating, by the node, the offline version of the GT at the node based on an obtained key-value pair when the new key points to a table entry in a second portion of the GT, wherein the key-value pair indicates the new value and the new key.

Example 72 may include one or more computer readable media including instructions, which when executed by a node, causes the node to perform the method of any one of examples 68-71 and/or one or more other examples herein.

Example 72X may include the method of example 71 or 72 and/or one or more other examples herein, wherein the node is to perform the method of examples 33-47.

Example 73 may include one or more computer readable media including instructions, which when executed by a node, causes the node to: obtain a control message to indicate that a global lookup table (GT) is to be updated based on a new key, wherein the GT maps keys to values of key-value pairs and is replicated across each node in the cluster, and wherein the GT is to be used for a first-level lookup operation in a two-level lookup scheme; identify a new handling node in the cluster to which the new key points, wherein the new handling node is to perform a second-level lookup operation in the two-level lookup scheme; generate an update message to indicate the new key and to instruct another node in the cluster to update distributed locally stored version of the GT based on the new key; and control transmission of the update message to each node in the cluster.

Example 74 may include the one or more computer readable media of example 73 and/or one or more other examples herein, wherein the control message is to designate the node as a control node, and the other node is a node that is permitted to update a corresponding portion of the GT independent of other nodes in the cluster.

Example 75 may include the one or more computer readable media of example 73 and/or one or more other examples herein, wherein the control message is to be obtained from a computer device outside of the cluster.

Example 76 may include the one or more computer readable media of examples 73-75 and/or one or more other examples herein, wherein the node, in response to execution of the instructions, is to: control storage of two versions of the GT including an online version of the GT and an offline version of the GT, wherein the online version of the GT is to be used for the first-level lookup operation, and wherein the node is permitted to modify a first portion of the GT at the node and is not permitted to modify other portions of the GT at the node; determine whether the new value is to be stored in the first portion of the GT; update the offline version of the GT at the node with the new value when the new key points to a table entry in the first portion of the GT; update the online version of the GT at the node based on the offline version of the GT at the node; and update the offline version of the GT at the node based on an obtained key-value pair when the new key points to a table entry in a second portion of the GT, wherein the key-value pair indicates the new value and the new key.

Example 76X the one or more computer readable media of example 76 and/or one or more other examples herein, wherein the node, in response to execution of the instructions, is to perform the functions, processes, procedures, and operations of examples 17-32.

Example 77 may include an apparatus to be implemented as a node in a cluster of a plurality of nodes, the apparatus comprising: global lookup table (GT) management means for: identifying, from a control message, a new key that points to a new handling node in the cluster, and generating an update message to indicate the new key and instruct a node in the cluster to update a locally stored version of a GT to include the new key, wherein the GT maps keys to values of key-value pairs and is replicated across each node in the cluster, and wherein the new handling node is to perform a second-level lookup operation in a two-level lookup scheme; and communications means for obtaining the control message, and broadcast the update message to each node in the cluster.

Example 78 may include the apparatus of example 77 and/or one or more other examples herein, wherein the control message is to designate the node as the control node.

Example 79 may include the apparatus of example 77 and/or one or more other examples herein, wherein the communications interface is to obtain the control message from a computer device outside of the cluster.

Example 80 may include the apparatus of examples 77-79 and/or one or more other examples herein, further comprising: storage means for storing two versions of the GT including an online version of the GT and an offline version of the GT, and wherein the node is permitted to modify a first portion of the GT and is not permitted to modify other portions of the GT, and wherein the GT management means is for: determining whether a new value is to be stored in a key-value pair in the first portion of the GT at the node, updating the offline version of the GT at the node with the new value when the new value is to be stored in the key-value pair in the first portion of the GT, updating the online version of the GT at the node based on the offline version of the GT at the node, and updating the offline version of the GT at the node based on an obtained key-value pair when the new value is to be stored in a second portion of the GT, wherein the obtained key-value pair indicates the new key and the new value.

Example 80X may include the apparatus of example 80 and/or one or more other examples herein, wherein the GT manager, memory, and communications interface are to perform the functions, processes, procedures, and operations of examples 48-63.

The invention claimed is:

1. An apparatus to be implemented as a node in a cluster of a plurality of nodes, the apparatus comprising:
    a memory to store two versions of a global lookup table (GT) including an online version of the GT and an offline version of the GT, wherein the GT maps keys to values of key-value pairs and is replicated across each node in the cluster, and the node is permitted to modify a first portion of the offline version of the GT at the node; and
    a GT manager to determine whether a new value is to be stored in a key-value pair in the first portion, update the key-value pair in the offline version of the GT of the node with the new value when the new value is to be stored in the key-value pair in the first portion, update the online version of the GT of the node based on the offline version of the GT of the node, and update the online version of the GT of the node based on an obtained key-value pair when the new value is to be stored in a second portion of the GT that the node is not permitted to modify, wherein the obtained key-value pair indicates the key and the new value.

2. The apparatus of claim 1, wherein the node is a first node in the cluster, the offline version of the GT at the node is a first offline version, and the apparatus further comprises:
    a communications interface to obtain a first message at least indicating the key of the key-value pair, and obtain a second message from a second node in the cluster, wherein the second message is to indicate the key-value pair, and wherein the key-value pair is based on a second offline version of the GT at the second node.

3. The apparatus of claim 2, wherein, when the new value is to be stored in the first portion, the GT manager is to:
    determine a mapping for storage of the new value in the first portion based on the key;
    insert the new value into the first offline version based on the mapping, wherein to insert the new value into the first offline version, the GT manager is to:
        create a new entry for the new value in the first offline version when the first offline version does not include an entry for the key; and
        replace a current entry in the first offline version with the new value when the first offline version does include an entry for the key.

4. The apparatus of claim 3, wherein the new value is a node identifier of a third node in the cluster, and wherein, when the new value is to be stored in the key-value pair in the first portion, the GT manager is further to:
    generate a third message indicating the key-value pair and the determined mapping, and
    wherein the communications interface is to send the third message to the third node using the node identifier, wherein the third node is to update a locally stored local lookup table (LT) to include at least the new value of the key-value pair, wherein the locally stored LT is to be used during a second-level lookup operation of a two level lookup procedure.

5. The apparatus of claim 4, wherein, when the new value is to be stored in the key-value pair in the first portion, the GT manager is further to:
    increment a version counter associated with the first offline version after the new value is inserted into the first offline version; and
    generate the third message to further include a value of the version counter.

6. The apparatus of claim 5, wherein the online version of the GT at the node is a first online version, the second node includes a second online version of the GT at the second node, and wherein:
    the communications interface is to obtain a fourth message from the third node, wherein the fourth message is to indicate that the third node has updated a third online version of the GT at the third node, a version number of the third online version, and another mapping for the key in the third online version; and
    the GT manager is to update the first online version based on the first offline version when the version number of the third online version is greater than the value of the version counter and the other mapping is equal to the determined mapping.

7. The apparatus of claim 2, wherein the memory is further to store a local lookup table (LT), and wherein, to update the online version of the GT of the node based on the obtained key-value pair, the GT manager is to:
    identify a mapping for storage of the new value;
    control storage of the new value in the LT according to the mapping;
    control storage of the new value in the online version according to the mapping, wherein, to control storage of the new value in the online version, the GT manager is to:
        create a new entry for the key when a current entry for the key does not exist in the online version; and
        replace contents of a current entry with the new value when the current entry for the key exists in the online version.

8. The apparatus of claim 7, wherein the second message is to further indicate the mapping for storage of the new value and a version number associated with the second offline version.

9. The apparatus of claim 8, wherein the GT manager is to:
implement a version counter associated with the online version or the identified mapping;
control storage of the new value in the online version when the version number associated with the second offline version is greater than a value of the version counter; and
increment the version counter after storage of the new value in the online version.

10. The apparatus of claim 9, wherein the version counter is a first version counter, and the version number associated with the second offline version is based on a value of a second version counter implemented by the second node.

11. The apparatus of claim 10, wherein:
the GT manager is further to generate a fifth message after storage of the new value in the online version of the GT at the node, wherein the fifth message is to indicate the key-value pair, the identified mapping, and the value of the first version counter; and
the communications interface is to broadcast the fifth message to each node in the cluster including the second node.

12. The apparatus of claim 10, wherein:
the GT manager is further to generate a sixth message after storage of the new value in the online version of the GT at the node, wherein the sixth message is to indicate the key-value pair, the identified mapping, the value of the first version counter, and an instruction to delete an LT entry in the LT for the key; and
the communications interface is to broadcast the sixth message to each node in the cluster except the second node.

13. The apparatus of claim 1, wherein each node in the cluster is permitted to modify a corresponding portion of the GT, wherein each corresponding portion of the GT has a size of 1/N, where N is a number of nodes in the cluster.

14. One or more non-transitory computer readable media including instructions, which when executed by a node in a cluster of a plurality of nodes, causes the node to:
determine whether a new value is to be stored in a key-value pair in a first portion of a global lookup table (GT), wherein the node includes two locally stored versions of the GT including an online version of the GT and an offline version of the GT, wherein the GT maps keys to values of key-value pairs and is replicated across each node in the cluster, and the node is permitted to modify a first portion of the GT;
update the key-value pair in the offline version of the GT of the node with the new value when the new value is to be stored in the key-value pair in the first portion;
update the online version of the GT at the node based on the offline version of the GT at the node;
update the online version of the GT based on an obtained key-value pair when the new value is to be stored in a second portion of the GT that the node is not permitted to modify, wherein the obtained key-value pair indicates a key and the new value; and
perform, for an obtained packet, a first-level lookup operation of a two-level lookup scheme on the updated online version of the GT at the node.

15. The one or more non-transitory computer readable media of claim 14, wherein the node is a first node, the offline version of the GT at the node is a first offline version, and in response to execution of the instructions, the node is to:
obtain a first message at least indicating the key of the key-value pair; and
obtain a second message from a second node in the cluster, wherein the second message is to indicate the key-value pair, and wherein the key-value pair is based on a second offline version of the GT at the second node.

16. The one or more non-transitory computer readable media of claim 15, wherein, when the new value is to be stored in the key-value pair in the first portion, the node, in response to execution of the instructions, is to:
determine a mapping for storage of the new value in the first portion based on the key; insert the new value into the first offline version based on the mapping, wherein to insert the key into the first offline version, the node, in response to execution of the instructions, is to:
create a new entry for the new value in the first off line version when the first offline version does not include an entry for the key; and
replace contents of a current entry in the first offline version with the new value when the first off line version does include an entry for the key.

17. The one or more non-transitory computer readable media of claim 16, wherein, when the new value is to be stored in the key-value pair in the first portion, the node, in response to execution of the instructions, is to:
generate a third message indicating the key-value pair and the determined mapping; and control transmission of the third message to the third node in the cluster using the new value, wherein the new value is a node identifier of the third node, wherein the third node is to update a locally stored local lookup table (LT) to include at least the new value of the key-value pair, and wherein the locally stored LT is to be used during a second-level lookup operation of a two-level lookup procedure.

18. The one or more non-transitory computer readable media of claim 17, wherein, when the new value is to be stored in the key-value pair in the first portion, the node, in response to execution of the instructions, is to:
increment a version counter associated with the first offline version after the new value is inserted into the first offline version; and
generate the third message to further include a value of the version counter.

19. The one or more non-transitory computer readable media of claim 18, wherein the online version of the GT at the node is a first online version, the second node includes a second online version of the GT, and the node, in response to execution of the instructions, is to:
obtain a fourth message from the third node, wherein the fourth message is to indicate that the third node has updated a third online version of the GT at the third node, a version number of the third online version, and another mapping for the key in the third online version; and
update the first online version based on the first offline version when the version number of the third online version is greater than the value of the version counter and the other mapping is equal to the determined mapping.

20. The one or more non-transitory computer readable media of claim 15, wherein, to update the first off line version based on the key-value pair, the node, in response to execution of the instructions, is to:

identify a mapping for storage of the new value;
control storage of the new value in a local lookup table (LT) based on the mapping, wherein the node is to include the LT;
control storage of the new value in the online version based on the mapping, wherein, to control storage of the new value, the node, in response to execution of the instructions, is to:
create a new entry for the key when a current entry for the key does not exist in the first offline version; and
replace contents of a current entry with the new value when a current entry for the key exists in the first offline version; and
update the online version of the GT at the node based on the first off line version.

21. An apparatus to be implemented as a node in a cluster of a plurality of nodes, the apparatus comprising:
a processor circuitry arranged to operate a global lookup table (GT) manager to:
identify, from a control message, a new key that points to a new handling node in the cluster, and
generate an update message to indicate the new key and instruct a node in the cluster to update a locally stored version of a GT to include the new key, wherein the GT maps keys to values of key-value pairs and is replicated across each node in the cluster, and wherein the new handling node is to perform a second-level lookup operation in a two-level lookup scheme; and
a communications interface to obtain the control message, and broadcast the update message to each node in the cluster.

22. The apparatus of claim 21, wherein the control message is to designate the node as a control node.

23. The apparatus of claim 21, wherein the communications interface is to obtain the control message from a computer device outside of the cluster.

24. The apparatus of claim 21, further comprising:
a memory to store two versions of the GT including an online version of the GT and an offline version of the GT, and wherein the node is permitted to modify a first portion of the GT and is not permitted to modify other portions of the GT, and
wherein the GT manager is to:
determine whether a new value is to be stored in a key-value pair in the first portion of the GT at the node,
update the offline version of the GT at the node with the new value when the new value is to be stored in the key-value pair in the first portion of the GT,
update the online version of the GT at the node based on the offline version of the GT at the node, and
update the offline version of the GT at the node based on an obtained key-value pair when the new value is to be stored in a second portion of the GT, wherein the obtained key-value pair indicates the new key and the new value.

25. A method to be performed by a node in a cluster of a plurality of nodes, the method comprising:
obtaining, by the node, a control message to indicate that a global lookup table (GT) is to be updated based on a new key, wherein the GT maps keys to values of key-value pairs and is replicated across each node in the cluster, and wherein the GT is to be used for a first-level lookup operation in a two-level lookup scheme;
identifying, by the node, a new handling node in the cluster to which the new key points, wherein the new handling node is to perform a second-level lookup operation in the two-level lookup scheme;
generating, by the node, an update message to indicate the new key and to instruct another node in the cluster to update a distributed locally stored version of the GT based on the new key; and
broadcasting, by the node, the update message to each node in the cluster.

26. The method of claim 25, wherein the control message is to designate the node as a control node, and the other node is a node that is permitted to update a corresponding portion of the GT independent of other nodes in the cluster.

27. The method of claim 25, wherein the control message is to be obtained from a computer device outside of the cluster.

28. The method of claim 25, further comprising:
storing, by the node in a local memory, two versions of the GT including an online version of the GT and an offline version of the GT, wherein the online version of the GT is to be used for the first-level lookup operation, and wherein the node is permitted to modify a first portion of the GT at the node and is not permitted to modify other portions of the GT at the node;
determining, by the node, whether the new value is to be stored in the first portion of the GT;
updating, by the node, the offline version of the GT at the node with the new value when the new key points to a table entry in the first portion of the GT;
updating, by the node, the online version of the GT at the node based on the offline version of the GT at the node; and
updating, by the node, the offline version of the GT at the node based on an obtained key-value pair when the new key points to a table entry in a second portion of the GT, wherein the key-value pair indicates the new value and the new key.

* * * * *

UNITED STATES PATENT AND TRADEMARK OFFICE
CERTIFICATE OF CORRECTION

Page 1 of 1

PATENT NO. : 10,394,784 B2
APPLICATION NO. : 15/389218
DATED : August 27, 2019
INVENTOR(S) : Byron Marohn et al.

It is certified that error appears in the above-identified patent and that said Letters Patent is hereby corrected as shown below:

In the Claims

Column 34
Line 18, Claim 16 "...off line" should read – "...offline"
Line 22, Claim 16 "...off line" should read – "...offline"
Line 65, Claim 20 "...off line" should read – "...offline"

Column 35
Line 15, Claim 20 "...off line..." should read – "...offline..."

Signed and Sealed this
Twelfth Day of November, 2019

Andrei Iancu
*Director of the United States Patent and Trademark Office*